US008922812B2

(12) United States Patent
Kuwahara et al.

(10) Patent No.: US 8,922,812 B2
(45) Date of Patent: Dec. 30, 2014

(54) NETWORK PRINTER

(75) Inventors: Tetsuya Kuwahara, Kyoto (JP); Masaki Tachibana, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 615 days.

(21) Appl. No.: 13/109,847

(22) Filed: May 17, 2011

(65) Prior Publication Data

US 2012/0013942 A1   Jan. 19, 2012

(30) Foreign Application Priority Data

Jul. 13, 2010   (JP) ................................ 2010-159188
Aug. 11, 2010  (JP) ................................ 2010-180255

(51) Int. Cl.
G06F 3/12         (2006.01)

(52) U.S. Cl.
CPC ............ G06F 3/1204 (2013.01); G06F 3/1263 (2013.01); G06F 3/1285 (2013.01)
USPC ....................................................... 358/1.15

(58) Field of Classification Search
USPC ................ 358/1.9, 1.13, 1.14, 1.15, 401, 296
See application file for complete search history.

(56) References Cited

U.S. PATENT DOCUMENTS

| | | | |
|---|---|---|---|
| 5,511,150 A * | 4/1996 | Beaudet et al. ............... | 358/1.14 |
| 5,832,301 A * | 11/1998 | Yamaguchi ..................... | 710/48 |
| 6,047,111 A | 4/2000 | Sugiura et al. ................ | 395/114 |
| 6,894,800 B2 * | 5/2005 | Sugaya ......................... | 358/1.15 |
| 8,526,032 B2 * | 9/2013 | Carney et al. ................. | 358/1.15 |
| 2005/0157324 A1 | 7/2005 | Miyazaki | |
| 2006/0227363 A1* | 10/2006 | Ogura ........................... | 358/1.15 |
| 2008/0106758 A1 | 5/2008 | Kazume ........................ | 358/1.15 |
| 2008/0246994 A1 | 10/2008 | Matsumoto et al. ......... | 358/1.15 |

FOREIGN PATENT DOCUMENTS

| | | |
|---|---|---|
| JP | 08-036472 | 2/1996 |
| JP | 08-272266 | 10/1996 |
| JP | 10084452 A | 3/1998 |
| JP | 2000085211 A | 3/2000 |
| JP | 2000272205 A | 10/2000 |
| JP | 2003-251894 | 9/2003 |
| JP | 2005044047 A | 2/2005 |
| JP | 2005-271417 | 10/2005 |
| JP | 2008-062564 | 3/2008 |
| JP | 2008-119833 | 5/2008 |
| JP | 2008-165413 | 7/2008 |
| JP | 2008-254346 | 10/2008 |
| JP | 2009297905 A | 12/2009 |

* cited by examiner

*Primary Examiner* — Vu B Hang
(74) *Attorney, Agent, or Firm* — DLA Piper LLP (US)

(57) ABSTRACT

A network printer includes a communication unit for carrying out transmission/reception of data via a network and a recording unit for printing out received print data. The communication unit includes a priority level determination unit, when second print data is accepted during reception of first print data, for determining priority between the first and second print data, and a first persistent connection control unit for executing a persistent connection control that prohibits a transmission source of print data determined as lower priority data from transmitting the print data while a session is being connected with the transmission source, and for permitting a transmission source of print data determined as higher priority data to transmit the print data.

17 Claims, 18 Drawing Sheets

NETWORK PRINTER

CROSS-REFERENCE TO RELATED APPLICATIONS

This application claims priority under 35 U.S.C 119 to Japanese Patent Application No. 2010-159188, filed on Jul. 13, 2010, and No. 2010-180255, filed on Aug. 11, 2010, which application is hereby incorporated by reference in its entirety.

BACKGROUND OF THE INVENTION

1. Field of the Invention
The present invention relates to a network printer.
2. Description of Related Art
In recent years, with the development of network communication technology and the spread of a network environment, a network printer, which is connected to a personal computer or the like via a network and prints out print data received from the personal computer or the like, has been widely used.

There is a network printer, for example, that is capable of simultaneously controlling a plurality of interpreters for expanding image data to run and is capable of simultaneously processing a plurality of network sessions. Such a network printer usually controls only a single interpreter to run. However, when a running interpreter is stopped due to various errors, such a network printer controls a subsequent interpreter to run in order to execute a process of a subsequent print job.

In the middle of receiving print data from a personal computer or the like, a network printer may accept a processing request of another print data from another personal computer or the like. In some cases, since the newly-accepted print data has priority over the previously-accepted print data that is being received, it may be desirable that the newly-accepted and higher-priority data is printed out earlier than the previously-accepted and lower-priority data.

However, when accepting the higher priority print data during receiving the previously-accepted print data, the above-described printer device does not consider whether to print out the newly-accepted and higher-priority print data first.

SUMMARY OF THE INVENTION

The present invention has been made in order to overcome the problems described above, and a first object of the present invention is to provide a network printer capable of printing out higher priority print data first when accepting such higher priority print data during receiving previously-accepted print data.

Meanwhile, there has been also conventionally known a network printer with a PC printing function to print out on paper a print data received from a personal computer or the like connected via a network such as a LAN, and an interrupt copying function to perform a copying process in the middle of execution of a PC printing process, for example. A request of an interrupt copy is accepted during reception of print data, which requires a large capacity of memory to store print data received during execution of an interrupt copying process. In particular, in a case that only a single printer engine or the like is provided, a plurality of image data cannot be simultaneously processed, which requires installation of a large capacity of memory.

In order to prevent a capacity of memory from being greatly increased, a configuration in which print data is not received during an interrupt copying process may be adopted. There is a copy device capable of carrying out a copy action by setting of an interrupt copying mode even in the middle of a printing operation. When the printer interrupt copying mode is set during execution of a printing operation in a printer mode, the copy device informs an external device (a communication terminal such as a personal computer) that the printing operation is suspended. Further, when the printer interrupt copying mode is cancelled, the copy device informs the external device of such cancellation, and transitions to the printer mode before the suspension in order to resume the suspended printing operation.

More specifically, when a printer interrupt key on an operation panel (a setup key of the interrupt copying mode) is pressed during the execution of the printing operation in the printer mode, the copy device transmits a key pressed-down acknowledgement to the external device. When receiving the key pressed-down acknowledgement, the external devices transitions to the interrupt copying mode, transmits a printer mode suspension command, and then stands by until the printer mode is resumed. Meanwhile, the copy device starts a copy action. Then, when a copy operation is completed and a printer interrupt termination key is pressed down, the copy device transmits a printer mode resuming command to the external device. When the printer mode is resumed, the external device carries out transmission of print data and the like in a same manner as that before the suspension. When output of all the print data is completed, the external device transmits a command to end the printer execution.

When performing the interrupt copying process, the above-described copy device transmits to or receives from the external device a command such as "a command to press down a key", "a command to interrupt a printer mode", "a command to resume a printer mode", or "a command to end printer execution" in order to suspend the printing operation. However, since transmission procedures and a command format of such a command are preliminarily determined, installation of a dedicated driver is required in the external device in order to cope with transmission/reception, analysis and the like of such a command. Therefore, a problem in terms of lack of versatility exists.

In order to overcome the problems described above, a second object of the present invention is to provide a network printer capable of executing an interrupt copying process in the middle of executing a receiving process of PC print data without installing a large capacity of memory and installing a dedicated driver in a communication terminal.

The network printer according to one embodiment of the present invention includes a communication unit for carrying out transmission/reception of data with a communication terminal connected via a network; an expansion unit for expanding print data received by the communication unit into raster data; and a recording unit for printing out the raster data expanded by the expansion unit on paper. The communication unit includes a priority level determination unit, when second print data is newly accepted in the middle of reception of previously-accepted first print data, for determining priority between the first and second print data; and a first persistent connection control unit for executing a persistent connection control which prohibits a transmission source of print data determined as lower priority data by the priority level determination unit from transmitting the print data while a session is being connected with the transmission source, and for permitting a transmission source of the print data determined as higher priority data to transmit the print data.

When newly accepting the second print data in the middle of receiving the previously-accepted first print data, the network printer determines priority between the first and second print data. Then, a transmission source of print data determined as higher priority data is permitted to transmit the print data. Meanwhile, a persistent connection control, which prohibits a transmission source of print data determined as lower priority data from transmitting the print data while a session is being connected with the transmission source, is executed. Accordingly, for example, when the subsequently-accepted second print data has priority over the previously-accepted first print data, transmission of the first print data is prohibited, and transmission of the second print data is permitted. Then, the subsequently-accepted and higher-priority second print data is received first and printed out on paper. Consequently, when higher priority print data is accepted during reception of previously-accepted print data, such higher priority print data can be printed out first.

In the network printer according to the present invention, when reception of print data determined as higher priority data between the first and second print data is completed, the first persistent connection control unit preferably permits a transmission source of print data determined as lower priority data to transmit the print data.

In this case, the persistent connection control is cancelled when the reception of the higher priority print data is completed, and then the transmission source of the lower priority print data is permitted to transmit the print data. Accordingly, the lower priority print data can be received and printed out on paper subsequent to the higher priority print data. Further, at the time of the cancellation of the persistent connection control, since a session is already connected with the transmission source, the reception of the lower priority print data can be promptly started.

In one embodiment, when a priority level of the first print data is determined to be lower than that of the second print data, the first persistent connection control unit preferably executes a persistent connection control with respect to a transmission source of the first print data at the timing of detection of information indicating a page break included in the first print data, and the expansion unit expands the first print data into raster data up to a page divided by the information indicating the page break.

In this case, the persistent connection control is executed at the page break of the first print data in order to prohibit transmission of the first print data. Therefore, such a printing process can be switched from the first to the second print data at the page break of the first print data. Further, a capacity of memory for temporarily storing the first print data can be reduced.

The network printer according to one embodiment includes a storage unit for temporarily storing the first print data received by the communication unit. The first persistent connection control unit preferably executes the persistent connection control with respect to the transmission source of the first print data at the timing that the priority level of the first print data is determined to be lower than that of the second print data, and permits the transmission source of the first print data to transmit the first print data after reception of the second print data is completed, and the expansion unit expands a portion of the first print data stored in the storage unit into a raster data, and then expands a remaining portion of the first print data transmitted from the transmission source into raster data, when the transmission source of the first print data is permitted to transmit the first print data.

In this case, when the priority level of the first print data is determined to be lower than that of the second print data, the persistent connection control is executed in order to prohibit the transmission of the first print data. Accordingly, the printing process can be further promptly switched from the first to the second print data, which makes it possible to promptly print out a higher priority print data. Further, when the transmission of the first print data is prohibited, a partly-received portion of the first print data is temporarily stored in the storage unit. Then, when reception of the second print data is completed and transmission of the first print data is permitted, the portion of the first print data stored in the storage unit is first expanded into raster data, and then the newly-received portion of the first print data is expanded into raster data, thereby printing out the first print data without missing every single portion of the first print data.

In one embodiment, the priority level determination unit preferably determines priority between the first and second print data in accordance with priority level information included in each print data.

In this manner, for example, priority can be appropriately determined in accordance with the priority level information indicating a priority level such as a higher level, a middle level, and a lower level that has been set by a user.

In one embodiment, the priority level determination unit preferably determines priority between the first and second print data in further consideration of timer print information and/or security print information in addition to the priority level information included in each print data.

A timer print is a function of temporarily accumulating print data to print out the print data on paper at specified time. A security print is a function of temporarily accumulating print data (or rasterized print data) to print out the print data on paper when a password is entered by the user, for example. In the network printer according to the present invention, a priority level of each print data is determined in further consideration of the timer print information and/or the security print information in addition to the priority level information included in each print data, thereby appropriately determining the priority level of each print data.

In one embodiment, when the priority level of the first print data is the same as that of the second print data, priority is given to the first print data.

In one embodiment, the network printer includes a scanning unit for scanning an original document to create image data; and the recording unit preferably prints out on paper the image data created by the scanning unit, and the communication unit includes a second persistent connection control unit, when a request of an interrupt copying process using the scanning unit and the recording unit is accepted in the middle of reception of the print data, for executes a persistent connection control that prohibits a transmission source of the print data from transmitting the print data while a session is being connected with the transmission source.

In one embodiment, when the request of the interrupt copying process is accepted in the middle of the reception of the print data, the persistent connection control (a keepalive), which prohibits the transmission source of the print data from transmitting the print data while the session is being connected with the transmission source, is executed, thereby stopping the transmission of the print data without installing a dedicated driver and the like in a communication terminal (the transmission source). Further, the network printer is not required to include a large capacity of memory. Consequently, the interrupt copying process can be performed in the middle of execution of a receiving process of PC print data without installing the large capacity of memory and installing the dedicated driver and the like in the communication terminal.

Further, in one embodiment, when scanning of an original document by the scanning unit is completed, the second persistent connection control unit preferably cancels the persistent connection control to permit the transmission source of the print data to transmit the print data.

In this case, the persistent connection control is cancelled at the time of completion of the scanning of the original document, and then the transmission source of the print data is permitted to transmit the print data. Accordingly, after the created image data is printed out, the print data is received, and then the print data can be printed out on paper. Moreover, at the time of the completion of the scanning of the original document, since the session is already connected with the transmission source, the reception of the print data can be promptly resumed.

In one embodiment, when the request of the interrupt copying process is accepted, the second persistent connection control unit preferably executes the persistent connection control with respect to the transmission source of the print data at the timing of detection of information indicating a paper break included in the print data, and the recording unit prints out a print data received from the transmission source in which the persistent connection control has been cancelled, after the print data has been printed out on paper up to a page divided by the information indicating the page break and the image data of the original document scanned by the scanning unit has been printed out.

In this case, the persistent connection control is executed at the page break of the print data in order to prohibit the print data from being transmitted. Therefore, the PC printing process can be switched to the interrupt copying process at the page break of the print data. Further, a capacity of memory for temporarily storing the print data can be reduced.

In one embodiment, the second persistent connection control unit preferably does not execute the persistent connection control when the detection of the information indicating the page break is followed by detection of information indicating completion of a print job. In this manner, an unnecessary persistent connection control can be prevented from being executed.

The network printer according to one embodiment includes a storage unit for temporarily storing the print data received by the communication unit, and the second persistent connection control unit preferably executes the persistent connection control with respect to the transmission source of the print data at the timing of the request of the interrupt copying process and the recording unit prints out a portion of the print data stored in the storage unit and a remaining portion of the print date received from the transmission source in which the persistent connection control has been cancelled, after the printing out of the image data of the original document scanned by the scanning unit.

In this case, at the time of the request of the interrupt copying process, the persistent connection control is executed in order to prohibit the print data from being transmitted. Accordingly, the printing process can be further promptly switched to the interrupt copying process, thereby promptly starting and executing the interrupt copying process. Moreover, when transmission of the print data is prohibited, a partly-received portion of the print data is temporarily stored in the storage unit. Then, when the scanning of the original document is completed and the transmission of the print data is permitted, the portion of the print data stored in the storage unit and a newly-received portion of the print data are printed out, thereby printing out the print data without missing every single portion of the print data.

Further, in one embodiment, the print data is PDL data. When the request of the interrupt copying process is accepted, the second persistent connection control unit preferably executes the persistent connection control with respect to a transmission source of the PDL data at the timing of detection of information indicating a page break included in the PDL data, and the expansion unit expands the PDL data into raster data up to a page divided by the information indicating the page break and expands a remaining portion of the PDL data received from the transmission source in which the persistent connection control have been cancelled, after the scanning of the original document by the scanning unit.

In this case, the persistent connection control is executed at the page break of the print data to prohibit transmission of the PDL data. Accordingly, the PC printing process can be switched to the interrupt copying process at the page break of the PDL data. Moreover, a capacity of memory for temporarily storing the PDL data can be reduced.

Further, in one embodiment, the network printer includes a storage unit for temporarily storing the PDL data received by the communication unit, and the second persistent connection control unit preferably executes the persistent connection control with respect to the transmission source of the PDL data at the timing of the request of the copying process; the expansion unit expands into raster data the portion of the PDL data stored in the storage unit and the remaining portion of the PDL data received from the transmission source in which the persistent connection control has been cancelled, after the cancellation of the persistent connection control; and the recording unit prints out the raster data expanded by the expansion unit after the printing out of the image data of the original document scanned by the scanning unit.

In this case, at the time of the request of the interrupt copying process, the persistent connection control is executed to prohibit the transmission of the PDL data. Consequently, the printing process can be further promptly switched to the interrupt copying process, and the interrupt copying process can be promptly started and executed. Further, when the transmission of the PDL data is prohibited, a partly-received portion of the PDL data is temporarily stored in the storage unit. Then, when scanning of the original document is completed and the transmission of the PDL data is permitted, the portion of the PDL data stored in the storage unit and a newly-received portion of the PDL data are expanded into raster data, and then printed out, thereby printing out the PDL data without missing every single portion of the PDL data.

Further, the print data may be replaced with GDI data. In this case, during reception of the PC print data in which the print data (GDI data) in the raster format created by a Graphic Device Interface (GDI) is used, even if the request of the interrupt copying process is made, the interrupt copying process can be appropriately executed. In such a system using GDI data, processes of rasterizing the data and the like are performed at a transmission source (at a communication terminal), and then the data is transmitted as a raster data to the network printer. Therefore, the network printer is not required to perform an expansion process for creating the raster data.

In one embodiment, the second persistent connection control unit preferably transmits information indicating that a receivable amount of data of the network printer is substantially zero to the transmission source in accordance with a TCP/IP at the time of execution of the persistent connection control. In this case, when the persistent connection control is executed, the information indicating that the receivable amount of data is substantially zero (typically zero) is transmitted to the transmission source of the print data in accordance with the TCP/IP. Accordingly, transmission of the print data by such a transmission source can be promptly stopped under a state in which a session is being connected with the transmission source.

According to the present invention, when higher priority print data is accepted during reception of previously-accepted print data, the higher priority pint data can be printed out first. Further, according to the present invention, without installing a large capacity of memory and installing a dedicated driver in a communication terminal, an interrupt copying process can be performed in the middle of execution of a receiving process of PC print data.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
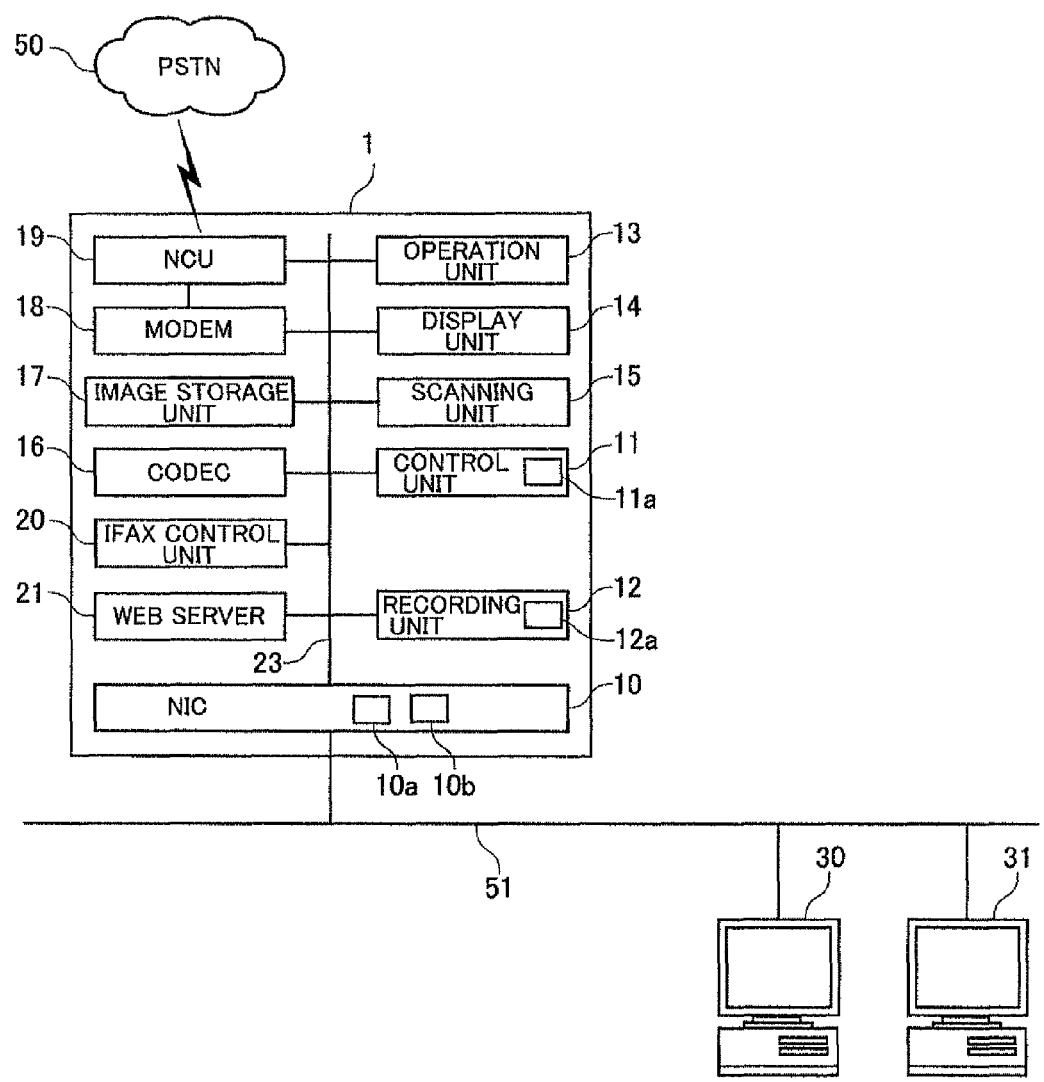
FIG. 1 is a block diagram illustrating an overall configuration of a network multifunctional peripheral according to a first embodiment.

Embodiments of the present invention are now described with reference to the drawings. Like reference numerals denote similar elements throughout the drawings and description thereof is omitted. A network printer applied as a network multifunctional peripheral (network MFP) is described as an example. Moreover, a network configuration, in which the network MFP is connected to two personal computers ("PCs") via a LAN is described as an example. The description of the configuration of a network system is simplified so as to be easily understood.

First Embodiment

An overall configuration of a network MFP 1 according to a first embodiment is described with reference to FIG. 1. FIG. 1 is a block diagram illustrating an overall configuration of the network MFP 1 connected to a LAN 51.

The network MFP 1 includes a scanner function to scan an original document to create image data, a copying function to print out on paper the image data created after the scanning, a FAX receiving function to print out on paper image data received via facsimile communication, and a PC printing function to print out on paper PC print data received from a PC 30 and a PC 31 connected to the network MFP 1 via the LAN 51. Further, the network MFP 1 includes a FAX transmitting function to transmit scanned image data by facsimile and a PC-FAX function to transmit image data received from the external PC 30 and PC 31 by facsimile. The network MFP 1 also includes an internet FAX (IFAX) function to transmit and receiving image data by email via IP networks and the like. In order to make each of the functions operate, the network MFP 1 includes a NIC 10, a control unit 11, a recording unit 12, an operation unit 13, a display unit 14, a scanning unit 15, a codec 16, an image storage unit 17, a modem 18, an NCU 19, an IFAX control unit 20, a web server 21, and the like. The above-described units are connected with one another via a bus (communication path) 23 so as to be capable of communicating with one another.

The NIC 10 is a network interface arranged to carry out a transmission/reception control process of various communication protocols and to carry out a data analysis process and a data creation process on the various communication protocols. The NIC 10 is connected to the PCs 30 and 31 via the LAN 51, and makes data communication with the PCS 30 and 31 in accordance with a TCP/IP, for example. The NIC 10, for example, makes a session with the PCs 30 and 31 in accordance with the TCP/IP in order to receive PC print data ("print data" or "PDL data") written in Page Description Language (PDL). Then, the received print data is transferred to the control unit 11.

The NIC 10 includes a microprocessor arranged to carry out calculations, a ROM arranged to store a program for controlling the microprocessor to execute each process and the like, a communication chip (an IC) arranged to perform a communication process while the communication process is being controlled by the microprocessor, a RAM arranged to temporarily store data that has been received and read out by the communication chip and the like, a backup RAM arranged to back up data, and the like. The NIC 10 may be structured by a microcomputer in which the microprocessor, the communication chip, the ROM, the RAM, and the like described above are kept in a single chip.

In the NIC 10, a priority level determination unit 10a and a persistent connection control unit 10b may be structured by combination of the above-described hardware and software.

When second print data (second PDL data) is newly accepted in the middle of reception of previously-accepted first print data (first PDL data), the priority level determination unit 10a determines priority between the first and second print data. More specifically, when the first print data is received, the priority level determination unit 10a analyzes a Printer Job Language (PJL) data included in the first print data, extracts priority level information and the like from the PJL data, and then stores the information and the like. Next, when the second print data is received, the priority level determination unit 10a analyzes PJL data included in the second print data and extracts priority level information and the like from the PJL data. Then, the priority level determination unit 10a compares the stored priority level information of the first print data and the like with the stored priority level information of the second print data and the like, in order to determine priority between the first and second print data.

At this point of time, the priority level determination unit 10a determines priority between the first and second print data in accordance with priority level information such as higher level information, middle level information, and lower level information that is included in print data (PJL data) and set by a user. Further, the priority level determination unit 10a determines priority between the first and second print data in consideration of timer print information and/or security print information included in the print data (the PJL data) in addition to the priority level information. A time-specified print is a function of temporarily accumulating the print data and printing out the print data on paper at specified time. A security print is a function of temporarily accumulating the print data (or rasterized print data), and printing out the print data on paper when a password is entered by the user, for example.

When the timer print is set, the priority level determination unit 10a determines priority between print data by comparing the print data, each print data having a specified time for printing out. When the security print is set, since it is not necessary to promptly print out the print data, the priority level determination unit 10a determines the print data as lower priority data. When a priority level of the first print data is the same as that of the second print data, the priority level determination unit 10a gives priority to the previously-accepted first print data. Then, a result of the priority determined by the priority level determination unit 10a is output to the persistent connection control unit 10b.

When a session establishment request signal, for example, is received from the PC 31 during a receiving process of PDL data from the PC 30 (during a time that a session is being established), for example, the persistent connection control unit 10b establishes a session with the PC 31 that has transmitted the session establishment request signal. Then, the persistent connection control unit 10b executes a persistent connection control (a "keepalive") that prohibits a transmission source (PC 30 or 31) of print data determined as lower priority data by the priority level determination unit 10a from transmitting the print data while the session is being connected with the transmission source. Meanwhile, the persistent connection control unit 10b permits a transmission source (PC 30 or 31) of print data determined as higher priority data to transmit the print data without executing the persistent connection control.

When the priority level of the first PDL data is determined to be lower than that of the second PDL data, for example, the persistent connection control unit 10b executes the persistent connection control with respect to a transmission source of the first PDL data at the timing of detection of information (page close information) indicating a page break included in the first PDL data. At this point of time, the NIC 10 transfers such data up to a page divided by the page close information to the control unit 11 (printer controller 11a) and informs the control unit 11 of an instruction to terminate the present process.

When reception of PDL data determined as higher priority data between the first and second PDL data is completed, the persistent connection control unit 10b cancels the persistent connection control to a transmission source of PDL data determined as lower priority data, and then permits the transmission source to transmit the PDL data. That is, when transmission of the first print data is permitted, for example, the NIC 10 first transfers a portion of the first PDL data, which has been received by a time of the start of the persistent connection control and has not been transferred yet, to the control unit 11 (printer controller 11a), and then transfers a newly-accepted portion of the first PDL data.

At this point of time, when executing the persistent connection control, the persistent connection control unit 10b sends an ACK (win=0) indicating that a window size is 0 as response to the PC 30 and the PC 31. After the ACK (win=0) is sent, the transmission sources (PCs 30 and 31) regularly transmit a signal TCP Zero Window Probe (win=0) that inquires about whether or not there is any space available in a receive buffer. Then, as response to such a signal, by sending a signal TCP Zero Window Probe ACK (win=0) indicating that there is no space in the receive buffer, the persistent connection control unit lob executes the persistent connection control. That is, during execution of the persistent connection control, the signal TCP Zero Window Probe ACK (win=0) is sent to respond to the signal TCP Zero Window Probe (win=0). Meanwhile, at a time of cancellation of the persistent connection control, the persistent connection control unit 10b transmits an ACK (win=4096) to the transmission sources, for example.

The control unit 11 includes a microprocessor arranged to carry out calculations, a ROM arranged to store a program for controlling the microprocessor to execute each process and the like, a RAM arranged to temporarily store various data such as a calculation result, a backup RAM arranged to store a backup data, and the like. The control unit 11 executes the program stored in the ROM to control the recording unit 12, the scanning unit 15, and the other hardware of the network MFP 1 in a comprehensive manner, and to make various functions such as a PC printing function, a PC-FAX function, and a copying function (an interrupt copying function) operate.

Further, the control unit 11 includes the printer controller 11a arranged to interpret PDL data input from, for example, the PC 30, the PC 31, or the like, and then expands the data into a raster data. The printer controller 11a includes a spool buffer arranged to temporarily store PDL data transferred from the NIC 10, and reads out and process the PDL data stored in the spool buffer when raster data is created. The raster data created by the printer controller 11a is output to the recording unit 12 via the control unit 11.

The recording unit 12, which is an electrophotographic printer, prints out on paper the raster data created by the printer controller 11a. Further, recording unit 12 prints out on paper image data created by scanning of the scanning unit 15 and image data received by FAX, IFAX, or the like. Therefore, the recording unit 12 is provided with a printer engine 12a.

The printer engine 12a is a printing mechanism for carrying out printing. The printer engine 12a prints out on paper the raster data input from the printer controller 11a. More specifically, the printer engine 12a executes a printing process such as paper feeding, charging to a drum, laser irradiation, toner application, and transcription and fixing on paper in order to print out the raster data.

The operation unit 13 is provided with a plurality of keys used when functions of the network MFP 1 are used (e.g., keys on a numerical keypad, abbreviated keys, a start key, a stop key, and various function keys). The display unit 14, which is a display device using a LCD and the like, displays an operational state and/or various settings of the network MFP 1.

The scanning unit 15 scans an original document set in a Auto Document Feeder (ADF) or the like per page to create image data. Specifically, the scanning unit 15 having a light source, a CCD, and the like scans the original document with respect to each line in accordance with preset vertical scanning line density, in order to create the image data. Further, when an interrupt copying request is made, the scanning unit 15 promptly starts scanning the original document. That is, even in the middle of reception or printing out of PDL data, the original document is scanned. Moreover, the image data created by the scanning unit 15 is output to the recording unit 12 in a copying process and is output to the codec 16 in a facsimile process.

The codec 16 encodes and compresses the image data scanned by the scanning unit 15, and decodes encoded and compressed image data. The image storage unit 17, which includes a DRAM and the like, stores image data encoded and compressed by the codec 16, image data received by FAX, image data that has been received from the external PCs 30 and 31 and then has been encoded and compressed, and the like.

The modem (modulating and demodulating device) 18 performs modulating and demodulating operations between digital and analog signals. Further, the modem 18 performs generating and detecting operations of various types of functional information such as a Digital Command Signal (DCS). The Network Control Unit (NCU) 19, which is connected to the modem 18, controls a connection between the modem 18 and a Public Switched Telephone Network (PSTN) 50. The NCU 19 is provided with functions of transmitting a call signal corresponding to a facsimile number of a transmission destination and detecting acceptance of the call signal.

The IFAX control unit 20 controls the IFAX function using an Internet environment. The IFAX control unit 20 has functions of transmitting an email in accordance with Simple Mail Transfer Protocol (SMTP) and receiving an email in accordance with Post Office Protocol (POP). The IFAX control unit 20 attaches an original document to be transmitted to an email as image data in TIFF format or the like, and then transmits the email to a mail address (a SMTP server). Further, the IFAX control unit 20 receives an email from a POP server once each setting period, and then prints out a file attached thereto. The web server 21 makes it possible to execute a predetermined HTTP task by accessing from the PC 30 or 31 data such as a home page, a login page and a facsimile operation page written in HTML, for example.

Figure 2:
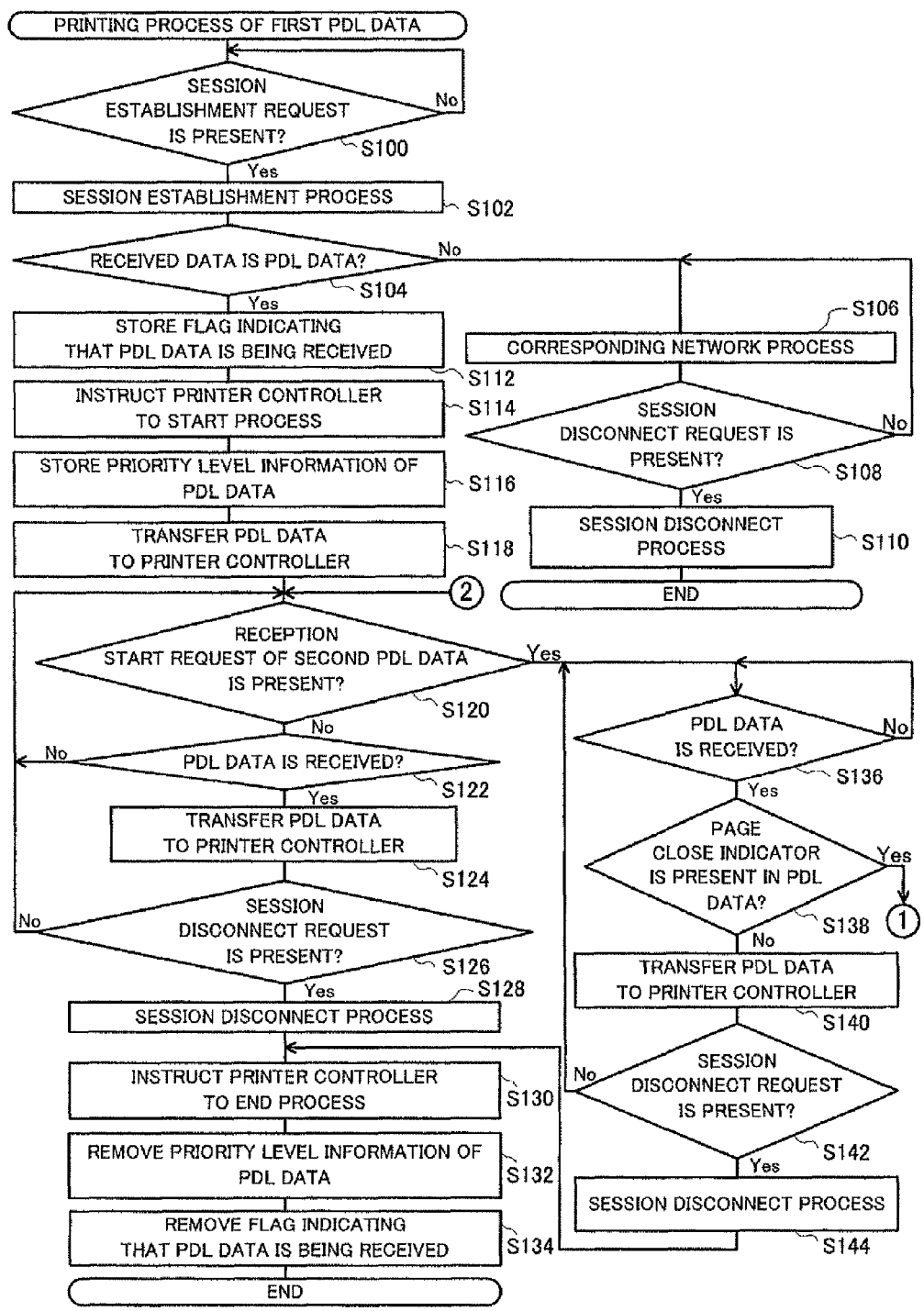
FIG. 2 is the first half of a flowchart illustrating handling procedures of a printing process of first PDL data by the network multifunctional peripheral according to the first embodiment.
Figure 3:
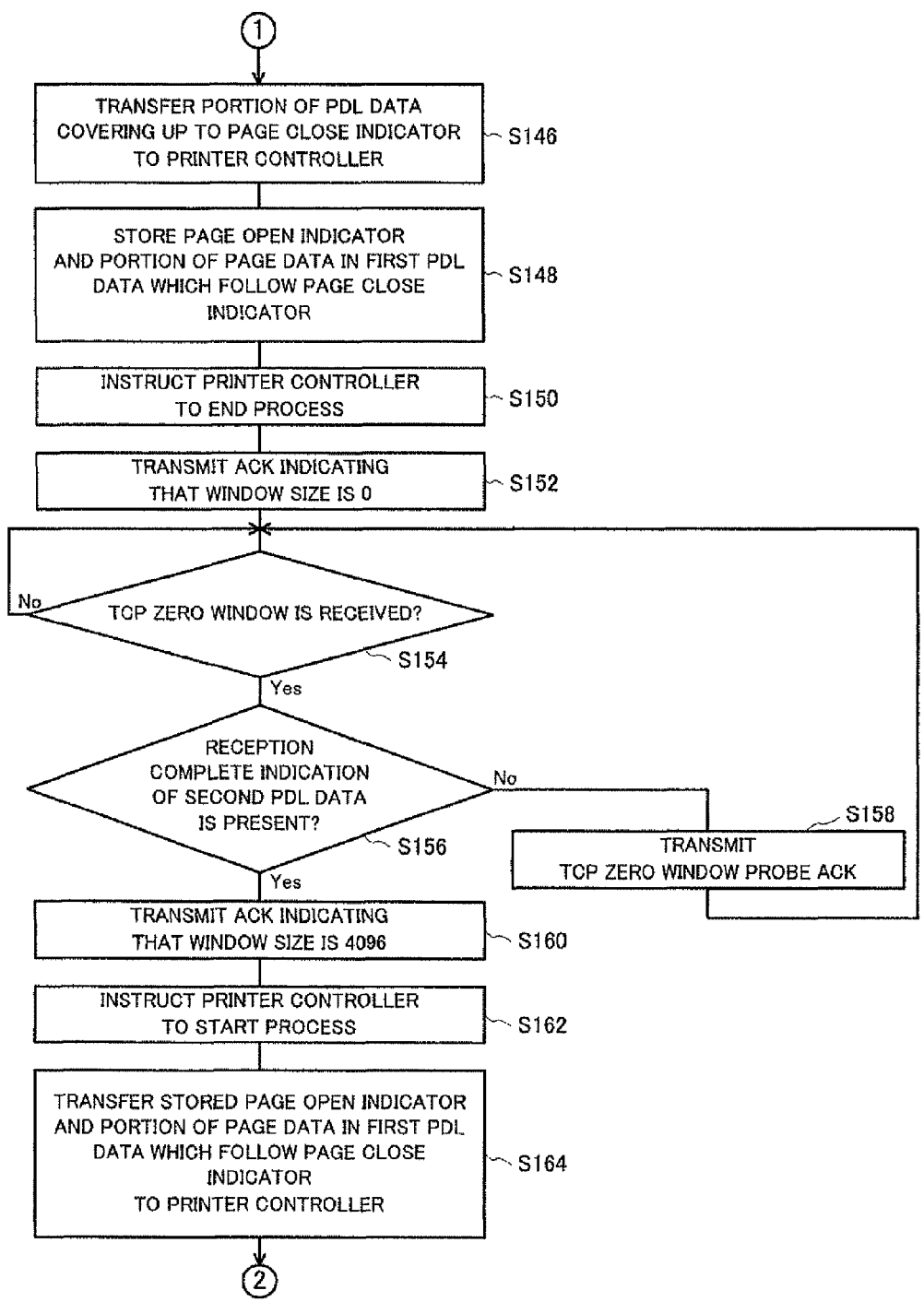
FIG. 3 is the second half of the flowchart illustrating the handling procedures of the printing process of the first PDL data by the network multifunctional peripheral according to the first embodiment.
Figure 4:
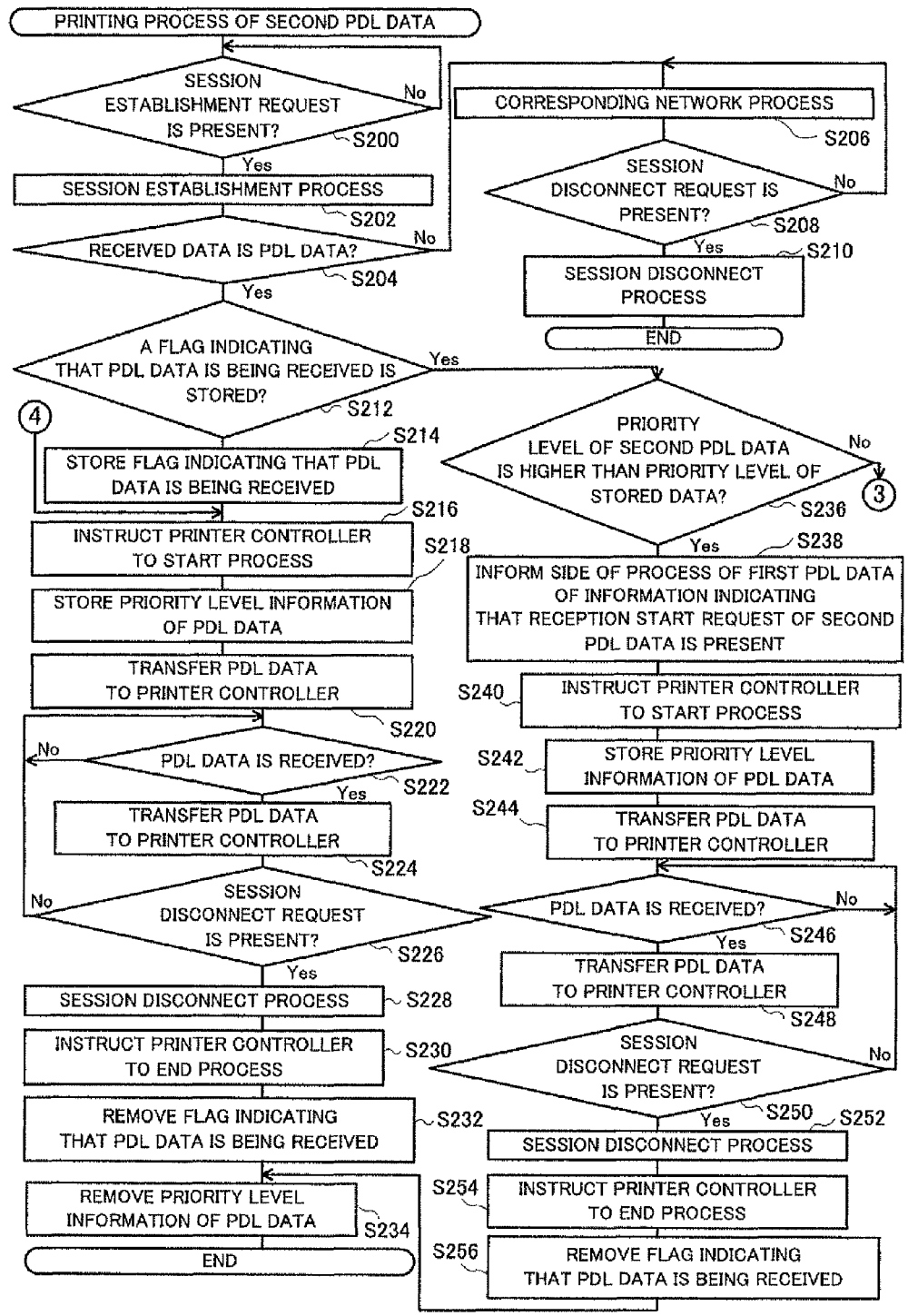
FIG. 4 is the first half of a flowchart illustrating handling procedures of a printing process of second PDL data by the network multifunctional peripheral according to the first embodiment.
Figure 5:
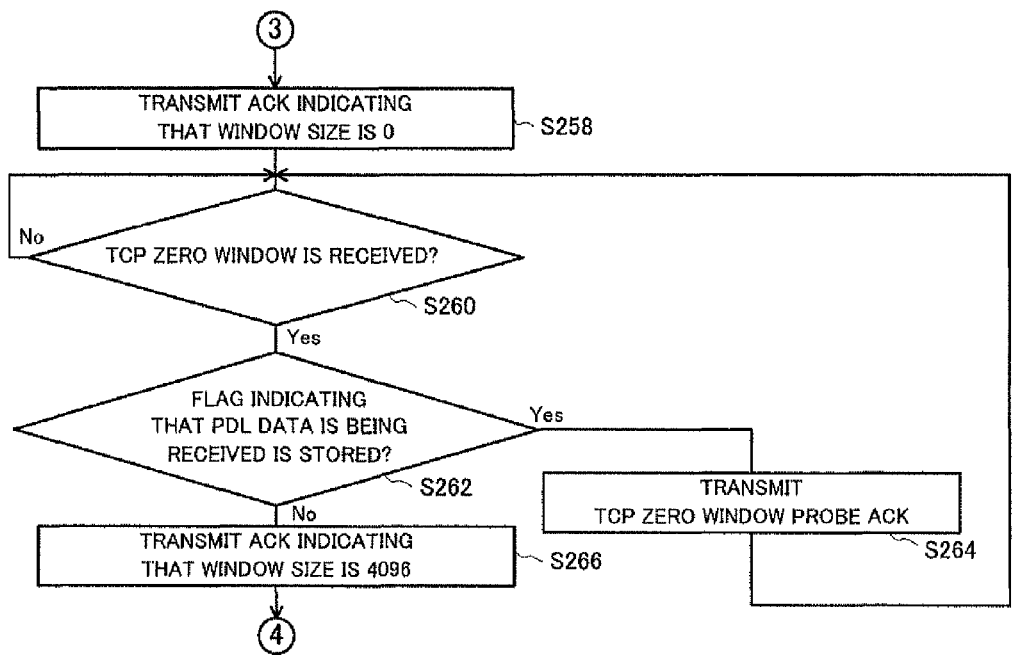
FIG. 5 is the second half of the flowchart illustrating the handling procedures of the printing process of the second PDL data by the network multifunctional peripheral according to the first embodiment.

Referring to FIGS. 2-5, a printing process of PDL data (PC print data) by the network MFP 1 is described. FIGS. 2 and 3 are respectively the first and second halves of a flowchart illustrating handling procedures of a printing process of first PDL data. FIGS. 4 and 5 are respectively the first and second halves of a flowchart illustrating handling procedures of a printing process of second PDL data.

First, referring to FIGS. 2 and 3, the printing process of the first PDL data is described. Step S100 determines whether or not a session establishment request is present (i.e., whether or not a SYN signal has been received). If the session establishment request is present, the printing process proceeds to step S102. If the session establishment request is not present, step S100 is repeatedly executed until the session establishment request is made.

When the session establishment request is present, a session establishment process is executed in step S102 such that a session is established with a transmission source of the session establishment request (e.g., the PC 30). More specifically, the session is established by sending an ACK/SYN signal as response to a SYN signal.

Step S104 determines whether or not received data is PDL data. If the received data is not PDL data, the process proceeds to step S106. If the received data is PDL data, the process proceeds to step S112.

When the received data is not PDL data, a network process corresponding to the received data is executed in step S106. Step S108 determines whether or not a session disconnect request is present (i.e., whether or not a FIN signal for controlling the session to be disconnected has been received). If the session disconnect request is present, the process proceeds to step S110. If the session disconnect request is not present, the process returns to and repeatedly executes step S106 until the session disconnect request is made.

When the session disconnect request is present, a session disconnect process is executed in step S110. More specifically, the session is disconnected by sending an ACK/FIN signal as response. The process is then terminated.

When the received data is PDL data, a flag indicating that PDL data is being received is stored in step S112. In step S114, the printer controller 11a is instructed to start a PC printing process.

In step S116, priority level information on PSL of the first PDL data and the like is stored. In step S118, the first PDL data is transferred to the printer controller 11a.

Step S120 determines whether or not a reception start request of the second PDL data (which will be described later in detail) is present. If the reception start request of the second PDL data is present, the process proceeds to step S136. If the reception start request of the second PDL data is not present, the process proceeds to step S122.

Step S122 determines whether or not the first PDL data has been received. If the first PDL data has been received, the process proceeds to step S124. If the first PDL data has not been received, the process returns to step S120, and steps S120 and S122 are repeatedly executed until the reception start request of the second PDL data is made or the first PDL data is received.

When the first PDL data has been received, the received first PDL data is transferred to the printer controller 11a in step S124. Step S126 determines whether or not a session disconnect request is present. If the session disconnect request is present, the process proceeds to step S128. If the session disconnect request is not present, the process returns to step S120, and then repeatedly executes step S120 and subsequent steps.

When the session disconnect request is present, a session disconnect process is executed in step S128 such that the session (with the PC 30, for example) is disconnected. In step S130, the printer controller 11a is instructed to end the PC printing process. The priority level information of the first PDL data is then removed in step S132, and the flag indicating that the PDL data is being received is also removed in step S134. The process is then terminated.

When step S120 determines that the reception start request of the second PDL data is present, step S136 determines whether or not the first PDL data has been received. If the first PDL data has been received, the process proceeds to step S138. If the first PDL data has not been received, step S136 is repeatedly executed until the first PDL data is received.

Step S138 determines whether or not a page close indicator (page close information) indicating a page close is present in the first PDL data. If the page close indicator is present, the process proceeds to step S146 of FIG. 3. If the page close indicator is not present, the process proceeds to step S140.

In step S140, the first PDL data is transferred to the printer controller 11a. Then, step S142 determines whether or not a session disconnect request is present. If the session disconnect request is present, the process proceeds to step S144. If the session disconnect request is not present, the process returns to step S136, and repeatedly executes step S136 and subsequent steps.

When the session disconnect request is present, a session disconnect process is executed in step S144 such that the session (with the PC 30, for example) is disconnected. Then, the process proceeds to step S130.

When step S138 determines that the page close indicator is present in the first PDL data, a portion of the first PDL data covering up to the page close indicator is transferred to the printer controller 11a in step S146. Then, in step S148, a page open indicator (page open information) indicating a page open and a portion of a page data in the first PDL data that follows the page close indicator are stored. The printer controller 11a is then instructed to end the PC printing process in step S150.

In step S152, an ACK indicating that a window size is 0 is transmitted. A persistent connection control, which prohibits the transmission source of the first PDL data (e.g., the PC 30) from transmitting the PDL data while the session is being connected with the transmission source, is then started. Step S154 then determines whether or not a TCP Zero Window inquiring about whether or not there is any space available in a receive buffer has been received. If the TCP Zero Window has not been received, step S154 is repeatedly executed until the TCP Zero Window is received. If the TCP Zero Window has been received, the process proceeds to step S156.

Step S156 determines whether or not a reception complete indication of the second PDL data is present. If the reception complete indication of the second PDL data is present, the process proceeds to step S160. If the reception complete indication of the second PDL data is not present, the process proceeds to step S158.

In step S158, by transmitting a TCP Zero Window Probe ACK indicating that there is no space in the receive buffer to the transmission source of the first PDL data (e.g., the PC 30), the persistent connection control is maintained. Then, the process returns to step S154 and repeatedly executes step S154 and subsequent steps.

When the reception complete indication of the second PDL data is present, by controlling an ACK indicating that a window size is 4096 to be transmitted in the step S160, the persistent connection control to the transmission source of the first PDL data (e.g., the PC 30) is cancelled. The printer controller 11a is then instructed to start a PC printing process in step S162. In step S164, the page open indicator (page open information) indicating a page open and the portion of the page data in the first PDL data that follow the page close indicator stored in step S148 are transferred to the printer controller 11a. The process then returns to and executes step S120 and subsequent steps.

The printing process of the second PDL data is described in FIGS. 4 and 5. Step S200 determines whether or not a session establishment request is present (i.e., whether or not a SYN signal has been received). If the session establishment request is present, the printing process proceeds to step S202. If the session establishment request is not present, step S200 is repeatedly executed until the session establishment request is made.

When the session establishment request is present, a session establishment process is executed in step S202 such that a session is established with a transmission source of the session establishment request (e.g., the PC 31). More specifically, the session is established by sending an ACK/SYN signal as response to the SYN signal.

Step S204 determines whether or not received data is PDL data. If the received data is not PDL data, the process proceeds to step S206. If the received data is PDL data, the process proceeds to step S212.

When the received data is not PDL data, a network process corresponding to the received data is executed in step S206. Step S208 then determines whether or not a session disconnect request is present (i.e., whether or not a FIN signal for controlling the session to be disconnected has been received). If the session disconnect request is present, the process proceeds to step S210. If the session disconnect request is not present, the process returns to and repeatedly executes step S206 until the session disconnect request is made.

When the session disconnect request is present, a session disconnect process is executed in step S210. More specifically, the session is disconnected by sending an ACK/FIN signal as response. The process is then terminated.

When the received data is PDL data, step S212 determines whether or not a flag indicating that the PDL data is being received has been stored. If the flag indicating that the PDL data is being received has been stored, the process proceeds to step S236. If the flag indicating that the PDL data is being received has not been stored, the process proceeds to step S214.

In step S214, the flag indicating that the PDL data is being received is stored. Subsequently, in step S216, the printer controller 11a is instructed to start a PC printing process.

Then, in step S218, priority level information on PJL of the second PDL data and the like are stored. The second PDL data is then transferred to the printer controller 11a in step S220.

Step S222 determines whether or not the second PDL data has been received. If the second PDL data has been received, the process proceeds to step S224. If the second PDL data has not been received, step S222 is repeatedly executed until the second PDL data is received.

When the second PDL data has been received, the received second PDL data is transferred to the printer controller 11a in step S224. Step S226 then determines whether or not a session disconnect request is present. If the session disconnect request is present, the process proceeds to step S228. If the session disconnect request is not present, the process returns to and repeatedly executes step S222 and subsequent steps.

When the session disconnect request is present, session disconnect process is executed in step S228 such that the session (with the PC 31, for example) is disconnected. Subsequently, in step S230, the printer controller 11a is instructed to end the PC printing process. Then, the flag indicating that the PDL data is being received is removed in step S232, and the priority level information of the second PDL data and the like are also removed in step S234. The process is then terminated.

When the flag indicating that the PDL data is being received has been stored in step S212, step S236 determines whether or not a priority level of the second PDL data is higher than a priority level of the stored first PDL data. Since a priority level is determined in the manner described above, a detailed description of the determination method is omitted here. If the priority level of the second PDL data is lower than the priority level of the first PDL data, the process proceeds to step S258 of FIG. 5. If the priority level of the second PDL data is higher than the priority level of the first PDL data, the process proceeds to step S238.

In step S238, a side of the process of the first PDL data (refer to step S120 of FIG. 2) is informed of information indicating that a reception start request of the second PDL data is present. The printer controller 11a is then instructed to start a PC printing process in step S240.

In step S242, priority level information on PJL of the second PDL data and the like are stored, and in step S244, the second PDL data is transferred to the printer controller 11a.

Step S246 then determines whether or not the second PDL data has been received. If the second PDL data has been received, the process proceeds to step S248. If the second PDL data has not been received, step S246 is repeatedly executed until the second PDL data is received.

When the second PDL data has been received, the received second PDL data is transferred to the printer controller 11a in step S248. Step S250 then determines whether or not a session disconnect request is present. If the session disconnect request is present, the process proceeds to step S252. If the session disconnect request is not present, the process returns to and repeatedly executes step S246 and subsequent steps.

When the session disconnect request is present, a session disconnect process is executed in step S252 such that the session (with the PC 31, for example) is disconnected. The printer controller 11a is then instructed to end the PC printing process in step S254, the flag indicating that the PDL data is being received is removed in step S256, and the process then returns to step S234.

When the priority level of the second PDL data is determined to be lower than the priority level of the first PDL data in step S236, an ACK indicating that a window size is 0 is transmitted in step S258, and then a persistent connection control, which prohibits a transmission source of the second PDL data (e.g., the PC 31) from transmitting a PDL data while the session is being connected with the transmission source, is started. Step S260 then determines whether or not a TCP Zero Window inquiring about whether or not there is any space available in a receive buffer has been received. If the TCP Zero Window has not been received, step S260 is repeatedly executed until the TCP Zero Window is received. If the TCP Zero Window has been received, the process proceeds to step S262.

Step S262 determines whether or not a flag indicating that the PDL data is being received has been stored. If the flag indicating that the PDL data is being received has been stored, the process proceeds to step S264. If the flag indicating that the PDL data is being received has not been stored, the process proceeds to step S266.

In step S264, by transmitting a TCP Zero Window Probe ACK indicating that there is no space in the receive buffer to the transmission source of the second PDL data (e.g., the PC 31), the persistent connection control is maintained. The process then returns to and repeatedly executes step S260 and subsequent steps.

When the flag indicating that the PDL data is being received has not been stored, by controlling an ACK indicating that a window size is 4096 to be transmitted in the step S266, the persistent connection control to the transmission source of the second PDL data (e.g., the PC 31) is cancelled. The process then returns to and repeatedly executes step S216 and subsequent steps.

According to the present embodiment, when the second PDL data is newly accepted in the middle of reception of the previously-accepted first PDL data, priority between the first and second PDL data is determined. Then, a transmission source of the print data determined as higher priority data is permitted to transmit such print data. Meanwhile, with respect to a transmission source of print data determined as lower priority data, the persistent connection control, which prohibits the transmission source from transmitting the print data while a session is being connected with the transmission source, is executed. Therefore, when the subsequently-accepted second PDL data has priority over the previously-accepted first PDL data, for example, transmission of the first PDL data is prohibited, and transmission of the second PDL data is permitted. Accordingly, the subsequently-accepted and higher-priority second PDL data is received first, and then printed out on paper. Consequently, when a higher priority PDL data is accepted during reception of a previously-accepted PDL data, such a higher priority PDL data can be printed out first.

Further, according to the present embodiment, the persistent connection control is cancelled when reception of the higher priority PDL data is completed, and then a transmission source of the lower priority PDL data is permitted to transmit the PDL data. Accordingly, the lower priority PDL data can be received and printed out on paper subsequent to the higher priority PDL data. Further, at the time of the cancellation of the persistent connection control, since a session is already connected with the transmission source, reception of the PDL data can be promptly started.

Further, according to the present embodiment, the persistent connection control is executed at a page break of the first PDL data to prohibit transmission of the first PDL data. Therefore, the printing process can be switched from the first to the second PDL data at the page break of the first PDL data. Further, a capacity of memory for temporarily storing the first PDL data can be reduced.

Further, according to the present embodiment, priority between the first and second PDL data is determined in accordance with priority level information which is included in each print data (each PJL data) and has been set by a user. Accordingly, the priority can be appropriately determined, for example, in accordance with the priority level information indicating a priority level such as a higher level, a middle level, and a lower level that has been set by the user.

Further, according to the present embodiment, a priority level of each print data is determined in further consideration of timer print information and/or security print information in addition to the priority level information included in each PDL data. Accordingly, the priority level of each print data can be more appropriately determined.

Second Embodiment

In the above-described embodiment, when a priority level of previously-accepted first PDL data is determined to be lower than a priority level of subsequently-accepted second PDL data, a persistent connection control does not start until a page close included in the first PDL data is detected; however, the persistent connection control may promptly start when the priority level of the first PDL data is determined to be lower.

Figure 6:
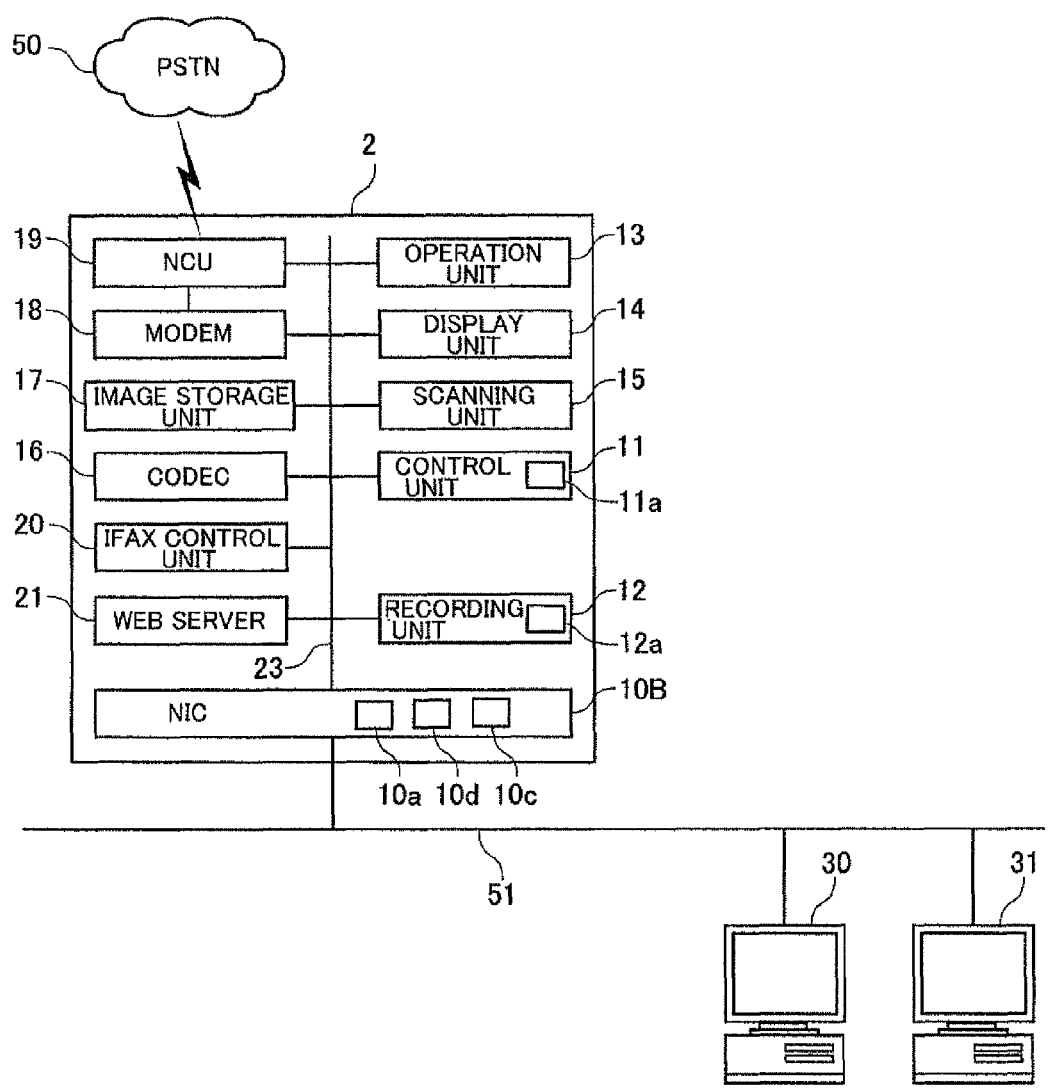
FIG. 6 is a block diagram illustrating an overall configuration of a network multifunctional peripheral according to a second embodiment.

A configuration of a network MFP 2 according to a second embodiment is now described with reference to FIG. 6. FIG. 6 is a block diagram illustrating an overall configuration of the network MFP 2. In FIG. 6, like reference numerals are used for elements that are the same as or similar to those of the first embodiment.

The network MFP 2 is different from the above-described network MFP 1 in that a NIC 10B having a memory 10c is provided in place of NIC 10. Moreover, the NIC 10B is different from the NIC 10 in that a persistent connection control unit 10d is provided in place of a persistent connection control unit 10b. The other elements are the same as or similar to those of the above-described network MFP 1; therefore, description thereof is omitted here.

The memory 10c, which includes a DRAM and the like, for example, temporarily stores received first PDL data. More specifically, the NIC 10B monitors information indicating a page break (page open information and page close information), and the memory 10c temporarily stores a page open indicator and a page data. Further, a page close indicator is not temporarily stored in the memory 10c, but is temporarily stored in a memory that is arranged in the NIC 10B (not the memory 10c).

When a priority level of first PDL data is lower than a priority level of second PLD data, for example, the persistent connection control unit 10d executes a persistent connection control with respect to a transmission source of the first PDL data when the first PDL data is determined to have lower priority than the second PDL data. Further, at this point of time, the NIC 10B informs a control unit 11 (printer controller 11a) of an instruction to discard rasterized data of a page that is being processed and to stop such a process.

After reception of the second PDL data is completed, the persistent connection control unit 10d permits the transmission source of the first PDL data (e.g., PC 30) to transmit the first PDL data. When the transmission of the first PDL data is permitted, the NIC 10B first transfers a portion of the first PDL data stored temporarily in the memory 10c to the control unit 11 (printer controller 11a), and then transfers a newly-received portion of the first PDL data.

Figure 7:
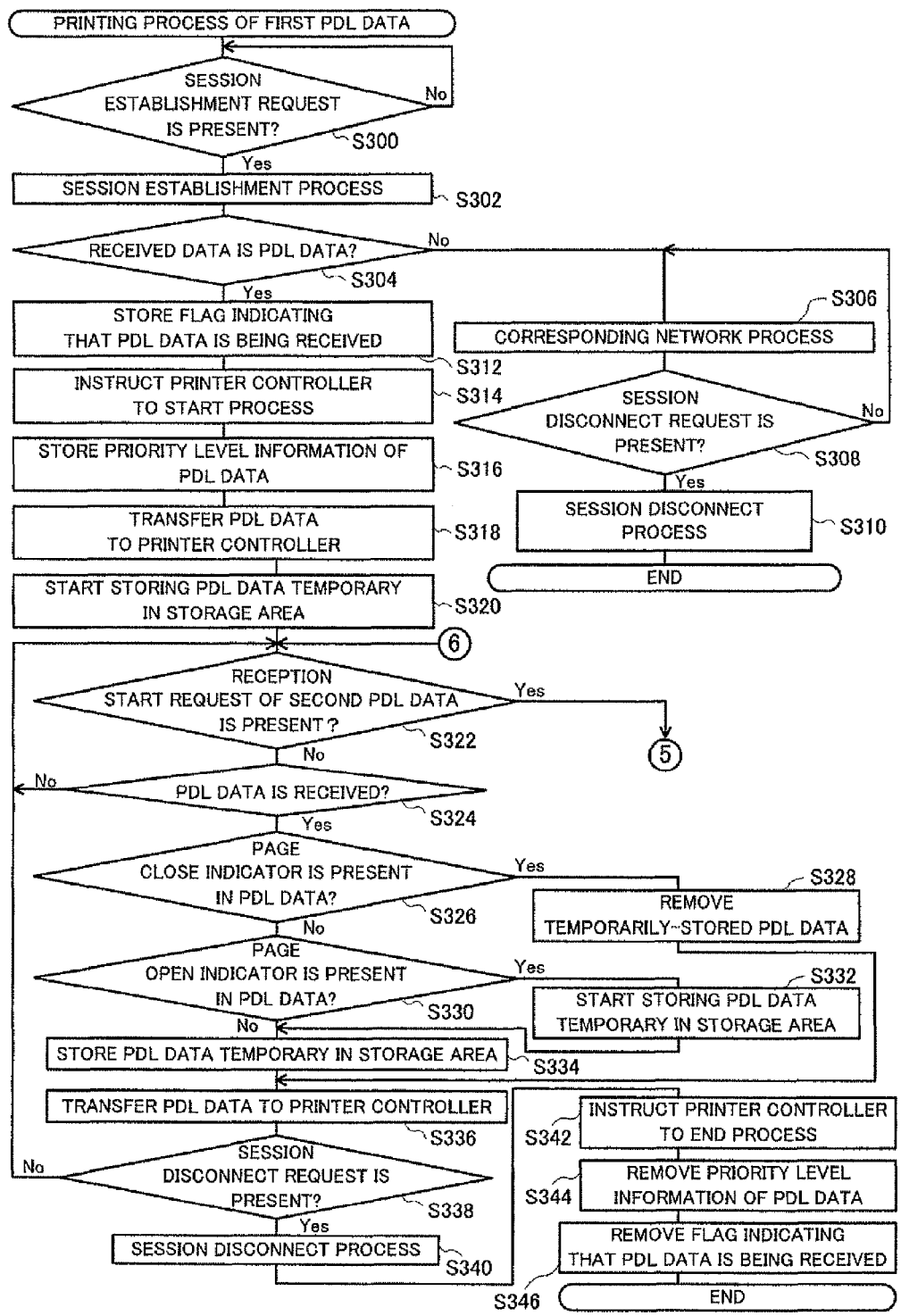
FIG. 7 is the first half of a flowchart illustrating handling procedures of a printing process of first PDL data by the network multifunctional peripheral according to the second embodiment.
Figure 8:
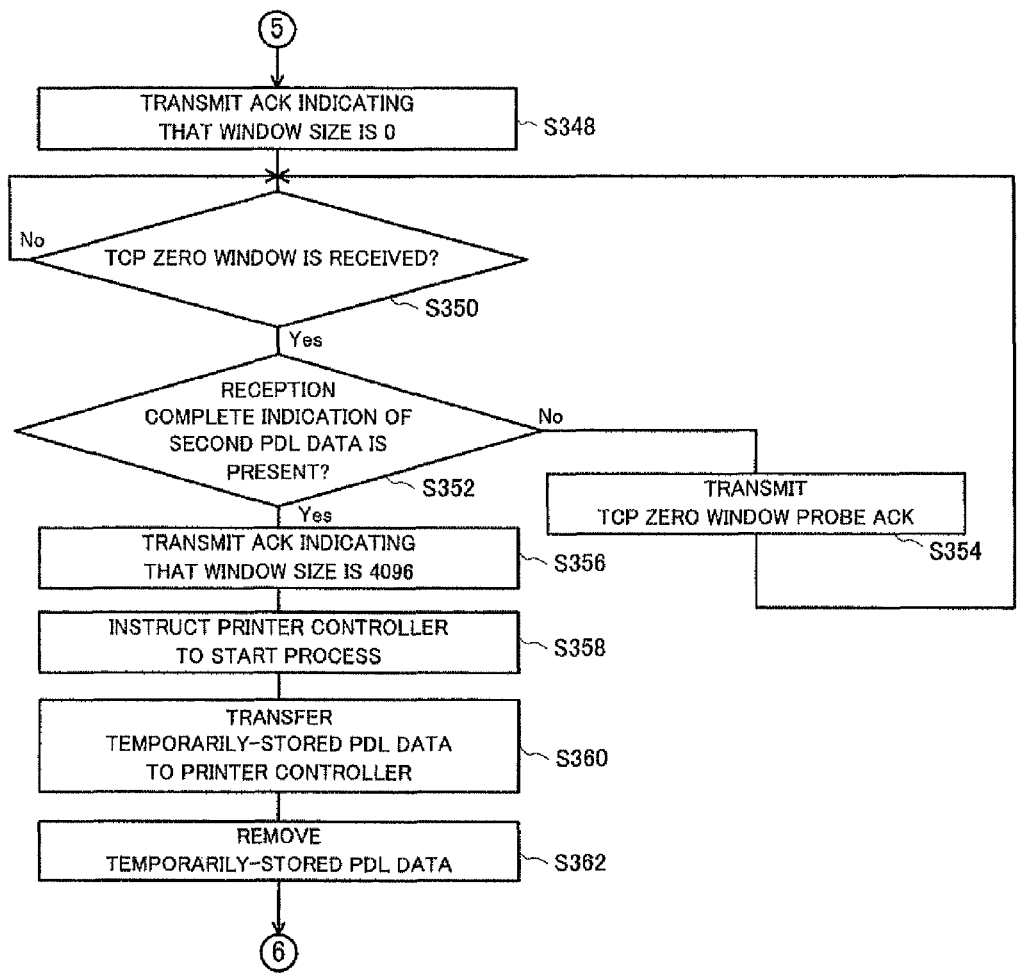
FIG. 8 is the second half of the flowchart illustrating the handling procedures of the printing process of the first PDL data by the network multifunctional peripheral according to the second embodiment.
Figure 9:
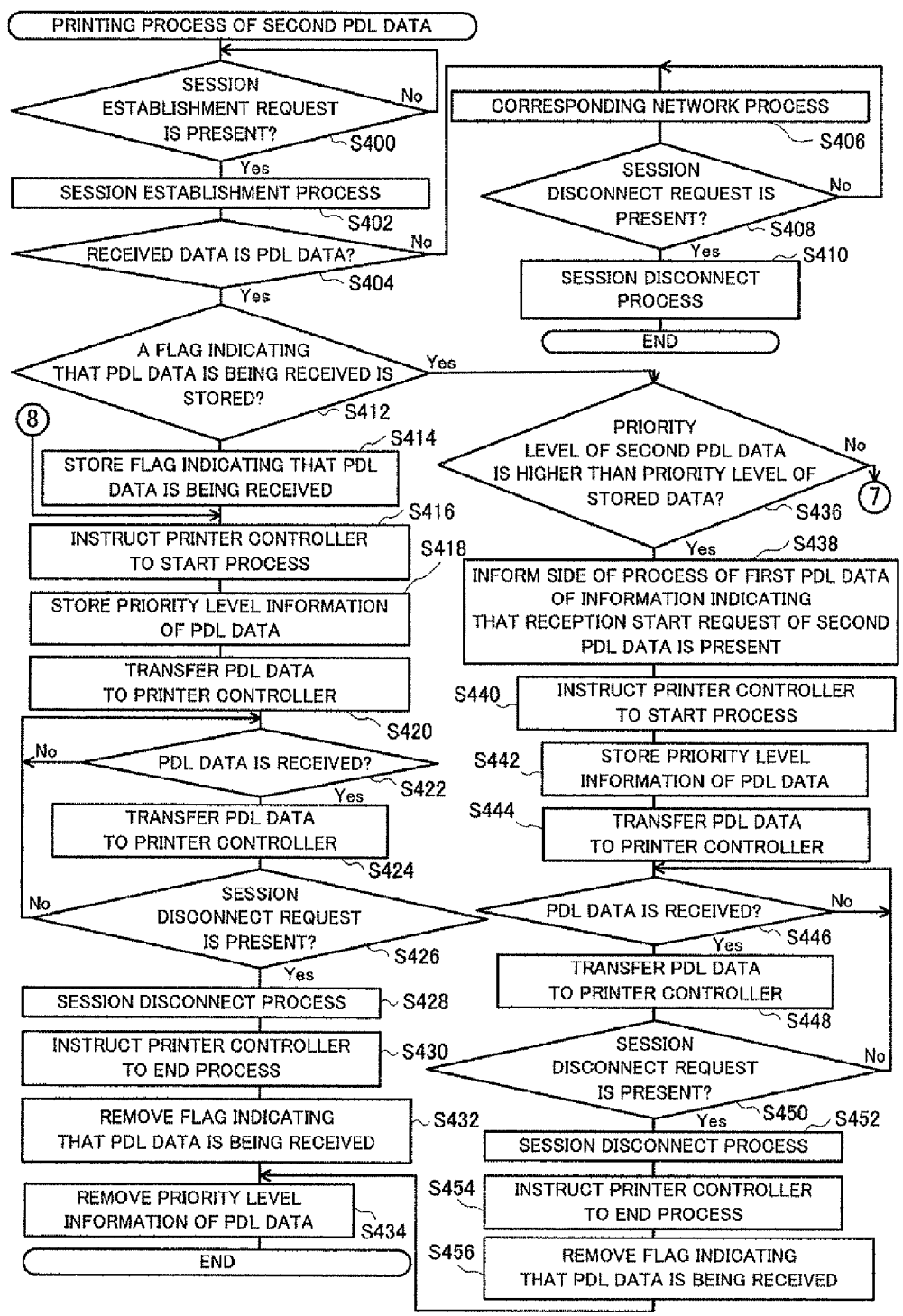
FIG. 9 is the first half of a flowchart illustrating handling procedures of a printing process of second PDL data by the network multifunctional peripheral according to the second embodiment.
Figure 10:
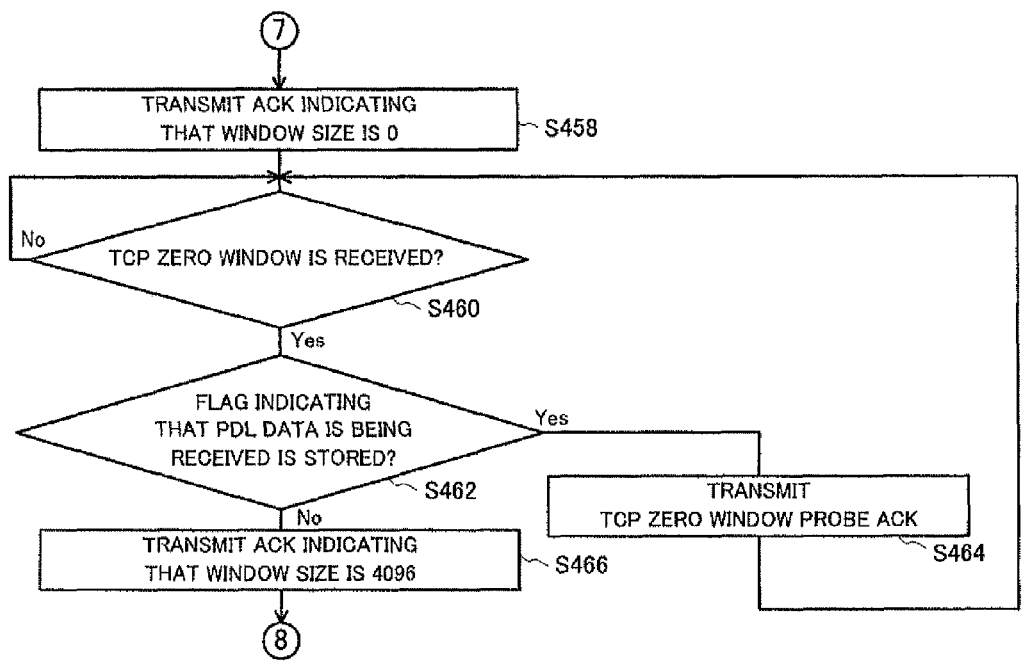
FIG. 10 is the second half of the flowchart illustrating the handling procedures of the printing process of the second PDL data by the network multifunctional peripheral according to the second embodiment.

Referring to FIGS. 7-10, a printing process of PDL data (PC print data) by the network MFP 2 is described. FIG. 7 and FIG. 8 are respectively the first and second halves of a flowchart illustrating handling procedures of a printing process of the first PDL data. FIGS. 9 and 10 are respectively the first and second halves of a flowchart illustrating handling procedures of a printing process of the second PDL data.

The printing process of the first PDL data is described with reference to FIGS. 7 and 8. Step S300 determines whether or not a session establishment request is present (i.e., whether or not a SYN signal has been received). If the session establishment request is present, the printing process proceeds to step S302. If the session establishment request is not present, step S300 is repeatedly executed until the session establishment request is made.

When the session establishment request is present, a session establishment process is executed in step S302 such that a session is established with a transmission source of the session establishment request (e.g., the PC 30). More specifically, the session is established by sending an ACK/SYN signal as response to the SYN signal.

Step S304 determines whether or not received data is PDL data. If the received data is not PDL data, the process proceeds to step S306. If the received data is PDL data, the process proceeds to step S312.

When the received data is not PDL data, a network process corresponding to the received data is executed in step S306. Step S308 then determines whether or not a session disconnect request is present (i.e., whether or not a FIN signal for controlling the session to be disconnected has been received). If the session disconnect request is present, the process proceeds to step S310. If the session disconnect request is not present, the process returns to and repeatedly executes step S306 until the session disconnect request is made.

When the session disconnect request is present, a session disconnect process is executed in step S310. More specifically, the session is disconnected by sending an ACK/FIN signal as response. The process is then terminated.

When the received data is PDL data, a flag indicating that the PDL data is being received is stored in step S312. The printer controller 11a is then instructed to start a PC printing process in step S314.

Priority level information on PJL of the first PDL data and the like is stored in step S316, the first PDL data is transferred to the printer controller ila in step S318, and then temporary storage of the first PDL data is started in step S320.

Step S322 determines whether or not a reception start request of the second PDL data is present. If the reception' start request of the second PDL data is present, the process proceeds to step S348 of FIG. 8. If the reception start request of the second PDL data is not present, the process proceeds to step S324.

Step S324 determines whether or not the first PDL data has been received. If the first PDL data has been received, the process proceeds to step S326. If the first PDL data has not been received, the process returns to step S322, and repeatedly executes steps S322 and S324 until the reception start request of the second PDL data is made or the first PDL data is received.

When the first PDL data has been received, step S236 determines whether or not the page close indicator (page close information) indicating a page close is present in the received first PDL data. If the page close indicator is present, the temporarily-stored first PDL data is removed in step S328, and then the page close indicator temporarily stored in the memory that is arranged in the NIC 10B (not the memory 10c) is transferred to the printer controller ila in step S336. If the page close indicator is not present, the process proceeds to step S330.

Step S330 determines whether or not the page open indicator (page open information) indicating a page start is present in the received first PDL data. If the page open indicator is present, temporary storage of the received first PDL data is started in step S332, and then the process proceeds to step S336. If the page open indicator is not present, the process proceeds to step S334.

The received first PDL data is temporarily stored in step S334, and then the received first PDL data is transferred to the printer controller 11a in step S336. Step S338 then determines whether or not a session disconnect request is present. If the session disconnect request is present, the process proceeds to step S340. If the session disconnect request is not present, the process returns to and repeatedly executes step S322 and subsequent steps.

When the session disconnect request is present, session disconnect process is executed in step S340 such that the session (with the PC 30, for example) is disconnected. Subsequently, in step S342, the printer controller 11a is instructed to end the PC printing process. Then, the priority level information of the first PDL data is removed in step S344, and the flag indicating that the PDL data is being received is also removed in step S346. The process is then terminated.

When step S322 determines that the reception start request of the second PDL data is present, an ACK indicating that a window size is 0 is transmitted in step S348 of FIG. 8, and then a persistent connection control, which prohibits the transmission source of the first PDL data (e.g., the PC 30) from transmitting a PDL data while the session is being connected with the transmission source, is started. Step S350 then determines whether or not a TCP Zero Window inquiring about whether or not there is any space available in a receive buffer has been received. If the TCP Zero Window has not been received, step S350 is repeatedly executed until the TCP Zero Window is received. If the TCP Zero Window has been received, the process proceeds to step S352.

Step S352 determines whether or not a reception complete indication of the second PDL data is present. If the reception complete indication of the second PDL data is present, the process proceeds to step S356. If the reception complete indication of the second PDL data is not present, the process proceeds to step S354.

In step S354, by transmitting a TCP Zero Window Probe ACK indicating that there is no space in the receive buffer to the transmission source of the first PDL data (e.g., the PC 30), the persistent connection control is maintained. The process then returns to and repeatedly executes step S350 and subsequent steps.

When the reception complete indication of the second PDL data is present, by transmitting an ACK indicating that a window size is 4096 in the step S356, the persistent connection control to the transmission source of the first PDL data (e.g., PC 30) is cancelled. The printer controller 11a is then instructed to start a PC printing process in step S358. In step S360, the temporarily-stored first PDL data is transferred to the printer controller 11a. The temporarily-stored first PDL data is removed in step S362, and the process then returns to and executes step S322 and subsequent steps.

A printing process (steps S400-S466) of the second PDL data by the network MFP 2 that is illustrated in FIGS. 9 and 10 is the same as the printing process in steps S200-S266; therefore, description thereof is omitted here.

According to the present embodiment, when a priority level of the first PDL data is determined to be lower than that of the second PDL data, a persistent connection control is executed such that transmission of the first PDL data is prohibited. Accordingly, the printing process can be promptly switched from the first to the second PDL data; thereby promptly printing out a higher priority print data. Moreover, when transmission of the first PDL data is prohibited, a partly-received portion of the first PDL data is temporarily stored in the memory 10c. Then, when the transmission of the first PDL data is permitted after completion of reception of the second PDL data, the portion of the first PDL data stored in the memory 10c is first expanded into raster data, and then a newly-received portion of the first PDL data is expanded into raster data, thereby printing out the first print data without missing every single portion of the first print data.

The first and second embodiments of the invention have been described; however, the invention is not limited to these embodiments and various changes and modifications can be made. For example, a network printer has been described as a network MFP; however, a single-function printer may be applied.

In the above-described embodiments, priority between the first and second PDL data is determined, and then a persistent connection control is executed. However, the persistent connection control may be executed when the second PDL data is received or a priority level is determined, for example.

Further, functional arrangements of elements of the network MFP 1 and MFP 2 are not limited to the arrangements in the above-described embodiments. For example, the memory 10c may be installed in the printer controller 11a in place of the NIC 10B.

Third Embodiment

Figure 11:
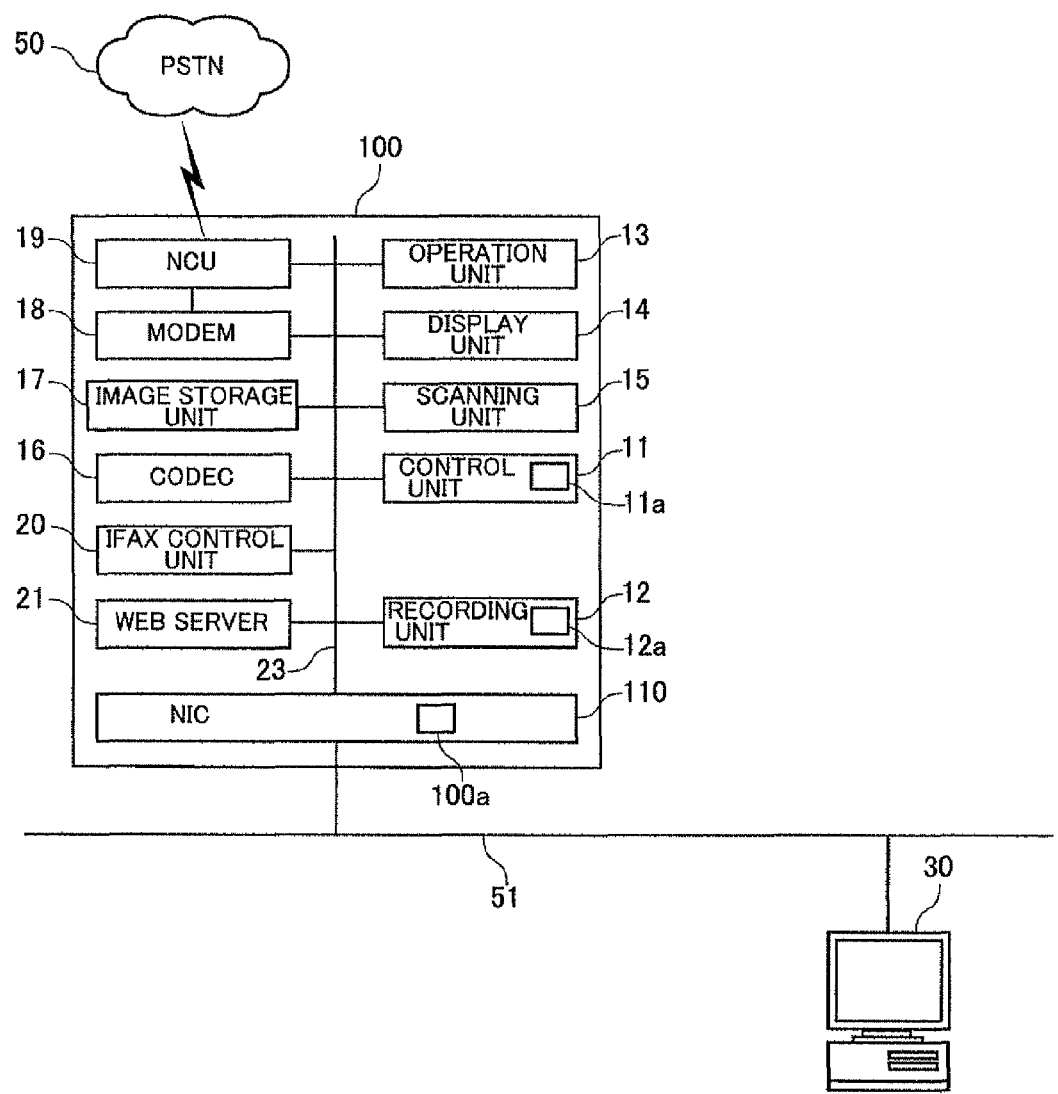
FIG. 11 is a block diagram illustrating an overall configuration of a network multifunctional peripheral according to a third embodiment.

A third embodiment is described with reference to FIGS. 11-14. First, an overall configuration of a network MFP 100 according to a third embodiment is described with reference to FIG. 11. FIG. 11 is a block diagram illustrating the overall configuration of the network MFP 100 connected to a LAN 51. In FIG. 11, like reference numerals are used for elements that are the same as or similar to those of the first embodiment.

The network MFP 100 is different from network MFP 1 or 2 in that a NIC 110 is provided in place of NIC 10 or NIC 10B. The other elements are the same as or similar to those of network MFP 1 or 2; therefore, description thereof is omitted here.

The NIC 110 includes a persistent connection control unit 100a. If a request of an interrupt copying process is made when PDL data is being received from PC 30 (during a receiving process) after establishment of a session with the PC 30, for example, the persistent connection control unit 100a executes a persistent connection control (a keepalive) that prohibits a transmission source of the PDL data (PC 30) from transmitting print data while a session is being connected with the transmission source.

More specifically, when the request of the interrupt copying process is made, the persistent connection control unit 100a executes the persistent connection control with respect to the transmission source of the PDL data (PC 30) at the timing of detection of information (page close information) indicating a page break included in the PDL data. At this point of time, the NIC 110 transfers such data up to a page divided by the page close information to control unit 11 (printer controller 11a), and informs the control unit 11 of an instruction to stop a currently-running process. Meanwhile, when detection is made on whether or not information indicating that the close of a print job is present (i.e., whether or not the page is the last page) after the detection of the information indicating the page break, if the information indicating the close of the print job is detected, the persistent connection control may not be executed.

The persistent connection control unit 100a terminates the persistent connection control at a time of completion of scanning of an original document by a scanning unit 15, and then permits the transmission source of the PDL data (PC 30) to transmit the PDL data. More specifically, when there is, for example, a space in an image storage unit 17 capable of storing at least a page of an A3-size document at resolution of 600 dpi at the time of completion of the scanning of the original document by the scanning unit 15, the persistent connection control is terminated. Meanwhile, when there is not enough space in the image storage unit 17 capable of storing at least a page of an A3-size document at resolution of 600 dpi, termination of the persistent connection control is deferred, and the persistent connection control can not be terminated until such enough space is created. If transmission of the PDL data is permitted, the NIC 110 first transfers a portion of the PDL data that has been received and has not been transferred by the time of the start of the persistent connection control to the control unit 11 (the printer controller 11*a*), and then transfers a newly-received portion of the PDL data to the control unit 11.

Figure 12:
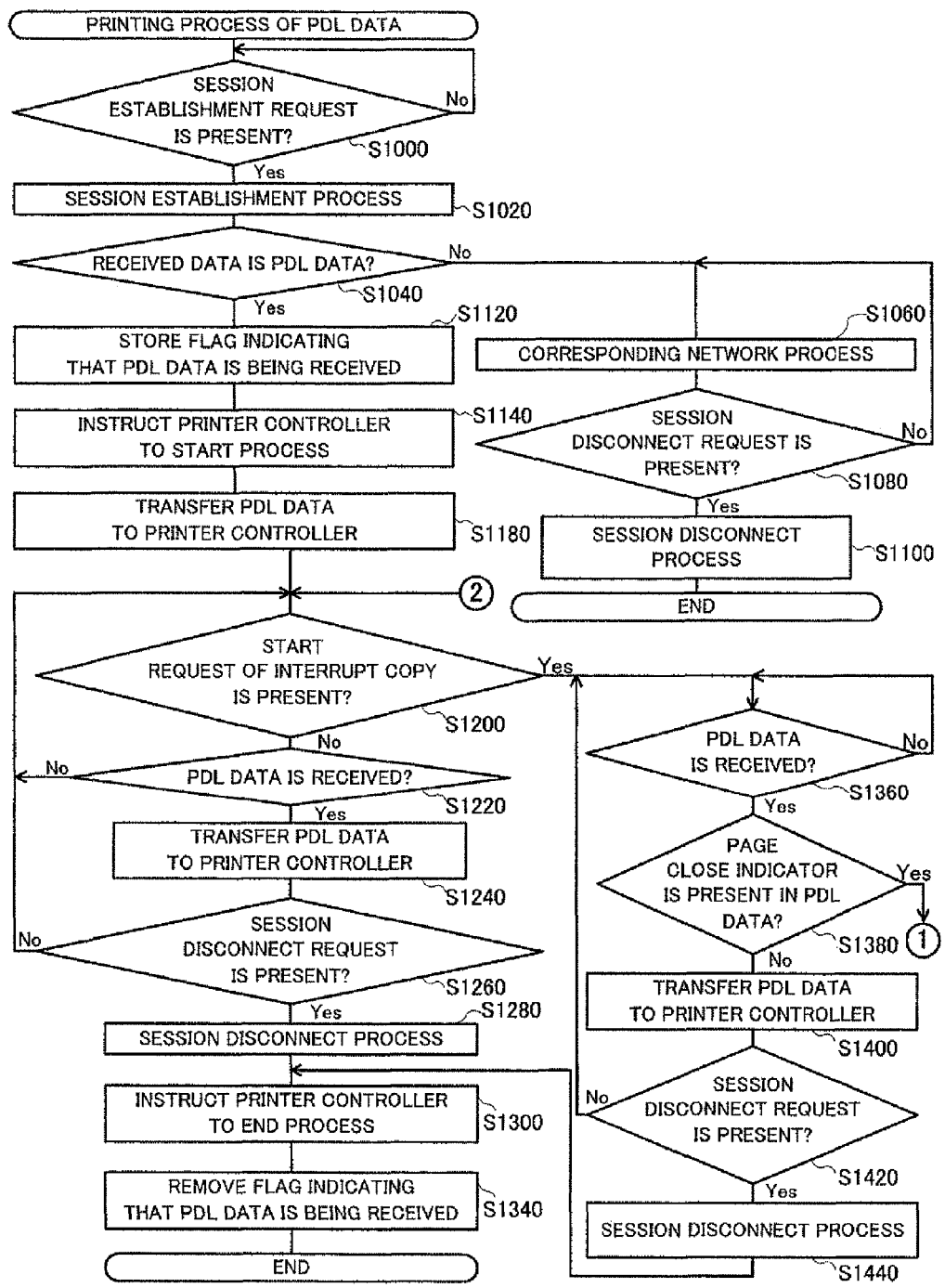
FIG. 12 is the first half of a flowchart illustrating handling procedures of a printing process of PDL data by the network multifunctional peripheral according to the third embodiment.
Figure 13:
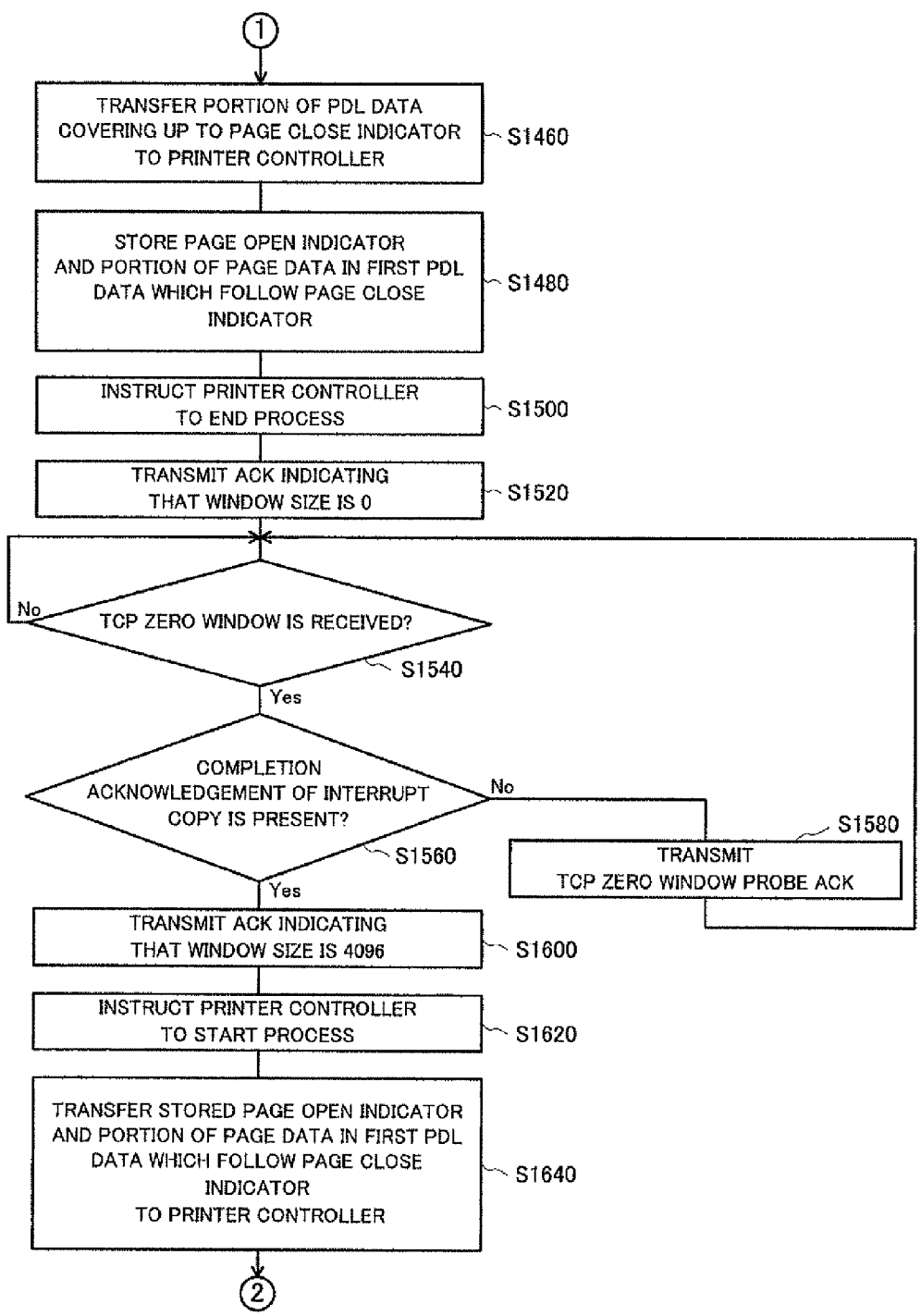
FIG. 13 is the second half of the flowchart illustrating the handling procedures of the printing process of the PDL data by the network multifunctional peripheral according to the third embodiment.
Figure 14:
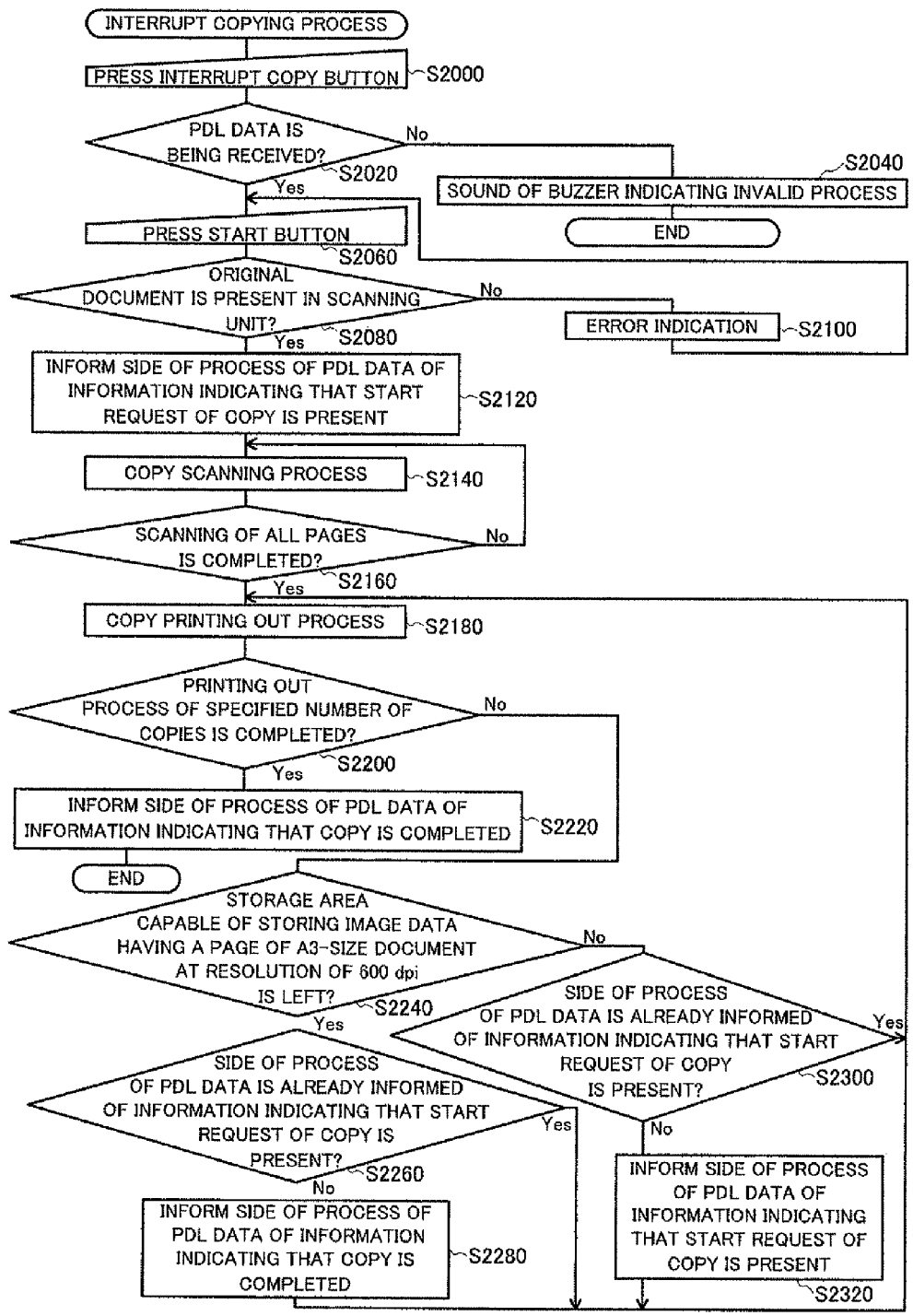
FIG. 14 is a flowchart illustrating handling procedures of an interrupt copying process by the network multifunctional peripheral according to the third embodiment.

Next, referring to FIGS. 12-14, a printing process and an interrupt copy of PDL data (PC print data) by the network MFP 100 is described. FIGS. 12 and 13 are respectively the first and second halves of a flowchart illustrating handling procedures of the printing process of the PDL data. FIG. 14 is a flowchart illustrating handling procedures of an interrupt copying process.

First, referring to FIGS. 12 and 13, the printing process of the PDL data is described. Step S1000 determines whether or not a session establishment request is present (i.e., whether or not a SYN signal has been received). If the session establishment request is present, the printing process proceeds to step S1020. If the session establishment request is not present, step S1000 is repeatedly executed until the session establishment request is made.

When the session establishment request is present, a session establishment process is executed in step S1020 such that a session is established with a transmission source of the session establishment request (e.g., the PC 30). More specifically, the session is established by sending an ACK/SYN signal as response to the SYN signal.

Step S1040 determines whether or not received data is PDL data. If the received data is not PDL data, the process proceeds to step S1060. If the received data is PDL data, the process proceeds to step S1120.

When the received data is not PDL data, a network process corresponding to the received data is executed in step S1060. Step S1080 then determines whether or not a session disconnect request is present (i.e., whether or not a FIN signal for controlling the session to be disconnected has been received). If the session disconnect request is present, the process proceeds to step S1100. If the session disconnect request is not present, the process returns to and repeatedly executes step S1060 until the session disconnect request is made.

When the session disconnect request is present, a session disconnect process is executed in step S1100. More specifically, the session is disconnected by sending an ACK/FIN signal as response. The process is then terminated.

When the received data is PDL data, a flag indicating that the PDL data is being received is stored in step S1120. The printer controller 11*a* is then instructed to start a PC printing process in step S1140, and the PDL data is transferred to the printer controller 11*a* in step S1180.

Step S1200 determines whether or not a start request of the interrupt copying process (which will be described later in detail) is present. If the start request of the interrupt copying process is present, the process proceeds to step S1360. If the start request of the interrupt copying process is not present, the process proceeds to step S1220.

Step S1220 determines whether or not the PDL data has been received. If the PDL data has been received, the process proceeds to step S1240. If the PDL data has not been received, the process returns to step S1200, and repeatedly executes steps S1200 and S1220 until the start request of the interrupt copying process is made or the PDL data is received.

When the PDL data has been received, the received PDL data is transferred to the printer controller 11*a* in step S1240. Step S1260 then determines whether or not a session disconnect request is present. If the session disconnect request is present, the process proceeds to step S1280. If the session disconnect request is not present, the process returns to and repeatedly executes step S1200 and subsequent steps.

When the session disconnect request is present, a session disconnect process is executed in step S1280 such that the session (with PC 30, for example) is disconnected. Subsequently, in step S1300, the printer controller 11*a* is instructed to end the PC printing process. Then, the flag indicating that the PDL data is being received is removed in step S1340. The process is then terminated.

When step S1200 determines that the start request of the interrupt copying process is present, step S1360 determines whether or not the PDL data has been received. If the PDL data has been received, the process proceeds to step S1380. If the first PDL data has not been received, step S1360 is repeatedly executed until the PDL data is received.

Step S1380 determines whether or not the page close indicator (page close information) indicating a page close is present in the PDL data. If the page close indicator is present, the process proceeds to step S1460 of FIG. 13. If the page close indicator is not present, the process proceeds to step S1400.

In step S1400, the PDL data is transferred to the printer controller 11*a*. Step S1420 then determines whether or not a session disconnect request is present. If the session disconnect request is present, the process proceeds to step S1440. If the session disconnect request is not present, the process returns to and repeatedly executes step S1360 and subsequent steps.

When the session disconnect request is present, a session disconnect process is executed in step S1440 such that the session (with PC 30, for example) is disconnected. The process then returns to step S1300.

When step S1380 determines that the page close indicator is present in the PDL data, a portion of the PDL data covering up to the page close indicator is transferred to the printer controller 11*a* in step S1460. Then, in step S1480, a page open indicator (page open information) indicating a page open and a portion of a page data in the first PDL data which follow the page close indicator are stored. The printer controller 11*a* is then instructed in step S1500 to end the PC printing process.

An ACK indicating that a window size is 0 is transmitted in step S1520. A persistent connection control, which prohibits the transmission source of the PDL data (e.g., the PC 30) from transmitting the PDL data while the session is being connected with the transmission source, is then started. Step S1540 then determines whether or not a TCP Zero Window inquiring about whether or not there is any space available in a receive buffer has been received. If the TCP. Zero Window has not been received, step S1540 is repeatedly executed until the TCP Zero Window is received. If the TCP Zero Window has been received, the process proceeds to step S1560.

Step S1560 determines whether or not a completion acknowledgement of the interrupt copying process (will be described later in detail) is present. If the completion acknowledgement of the interrupt copying process is present, the process proceeds to step S1600. If the completion acknowledgement of the interrupt copying process is not present, the process proceeds to step S1580.

In step S1580, by transmitting a TCP Zero Window Probe ACK indicating that there is no space in the receive buffer to the transmission source of the PDL data (e.g., PC 30), the persistent connection control is maintained. Then, the process returns to and repeatedly executes step S1540 and subsequent steps.

When the completion acknowledgement of the interrupt copying process is present, by transmitting an ACK indicating that a window size is 4096 in the step S1600, the persistent connection control to the transmission source of the PDL data (e.g., the PC 30) is cancelled. Subsequently, in step S1620, the printer controller 11a is instructed to start a PC printing process. Then, in step S1640, the page open indicator (page open information) indicating a page open and the portion of the page data in the first PDL data which follow the page close indicator stored in step S1480 are transferred to the printer controller 11a. Then, the process returns to and executes step S1200 and subsequent steps.

The interrupt copying process is now described with reference to FIG. 14. In step S2000, an interrupt copy button is pressed by a user, which enables an interrupt copy request signal to be input. Step S2020 then determines whether or not the PDL data (print data) is being received. If the PDL data is not being received, a sound of a buzzer indicating an invalid process is output in step S2040, and then the process is terminated. If the PDL data is being received, the process proceeds to step S2060.

In step S2060, a start button of copying is pressed by the user, which enables a copy start signal to be input. Step S2080 then determines whether or not an original document has been set in the scanning unit 15. If the original document has not been set in the scanning unit 15, an error indication is displayed in a display unit 14 in step S2100, the process returns to step S2060, and then steps S2060 and S2080 are repeatedly executed until the original document is set in the scanning unit 15. If the original document has been set in the scanning unit 15, the process proceeds to step S2120.

In step S2120, a side of the process of the PDL data is informed of information indicating that a start request of an interrupt copying process is present (refer to step S1200 of FIG. 12). Then, in step S2140, a scanning process of the set original document is executed. Step S2160 then determines whether or not scanning of the entire original document (i.e., scanning of all the pages of the original document) is completed. If a portion of the original document that has not been scanned yet is present, the process returns to step S2140, and then steps S2140 and S2160 are repeatedly executed until the entire original document is scanned. If the scanning of the entire original document is completed, the process proceeds to step S2180.

In step S2180, the scanned original document is printed out. Step S2200 then determines whether or not a printing out process of the original document, for which the number of copies is specified by the user, is completed. If the printing out process of the specified number of copies is completed, the process proceeds to step S2220. If the printing out process of the specified number of copies is not completed yet, the process proceeds to step S2240.

Step S2240 determines whether or not a storage area capable of storing image data having a page of an A3-size document at resolution of 600 dpi is left. If the storage area capable of storing the image data is left, the process proceeds to step S2260. If the storage area capable of storing the image data is not left, the process proceeds to step S2300.

Step S2260 determines whether or not the side of the process of the PDL data has been informed of the information indicating that the start request of the interrupt copying process is present. If the information has been already provided, the process returns to step S2180, and step S2180 and subsequent steps are then executed again. If the information has not been provided yet, the side of the process of the PDL data is informed of information indicating that the interrupt copying process is completed in step S2280 (refer to step S1560 of FIG. 13), and the process then returns to and executes step S2180 and subsequent steps again.

When step S2240 determines that there is not enough storage area left, step S2300 determines whether or not the side of the process of the PDL data has been informed of the information indicating that the start request of the interrupt copying process is present. If the information has been already provided, the process returns to and executes step S2180 and subsequent steps again. If the information has not been provided yet, the side of the process of the PDL data is informed of the information indicating that the start request of the interrupt copying process is present in step S2320 (refer to step S1200 of FIG. 12), and the process then returns to and executes step S2180 and subsequent steps again.

When step S2200 determines that the printing out of the specified number of copies is completed, the side of the process of the PDL data is informed of the information indicating that the interrupt copying process is completed in step S2220 (refer to step S1560 of FIG. 13). Then, the process is terminated.

According to this embodiment, when a request of an interrupt copying process is made in the middle of reception of a PDL data (a PC print data), a persistent connection control, which prohibits a transmission source of the PDL data (e.g., the PC 30) from transmitting the PDL data while a session is being connected with the transmission source, is executed, thereby stopping the transmission of the PDL data without installing a dedicated driver and the like in a communication terminal (the PC 30). Further, the network MFP 100 is not required to include a large capacity of memory. Consequently, the interrupt copying process can be performed in the middle of execution of a receiving process of the PC print data without installing the large capacity of memory and installing the dedicated driver and the like in the communication terminal.

Further, according to this embodiment, the persistent connection control is cancelled at a time of completion of scanning of an original document, and then the transmission source of the PDL data (e.g., the PC 30) is permitted to transmit the PDL data. Accordingly, after a created image data is printed out, the PDL data is received, and then the PDL data can be printed out on paper. Moreover, at the time of the completion of the scanning of the original document, since the session is already connected with the transmission source, the reception of the PDL data can be promptly started.

Further, according to this embodiment, the persistent connection control is executed at a page break of the PDL data to prohibit transmission of the PDL data. Therefore, a PC printing process can be switched to a copying process at the page break of the PDL data. Moreover, a capacity of memory for temporarily storing the PDL data can be further reduced.

Fourth Embodiment

In the above-described embodiment, when an interrupt copy request is accepted during reception of a PDL data, a persistent connection control is not started until a page close included in the PDL data is detected. However, the persistent connection control may be started promptly when the interrupt copy request is accepted.

Figure 15:
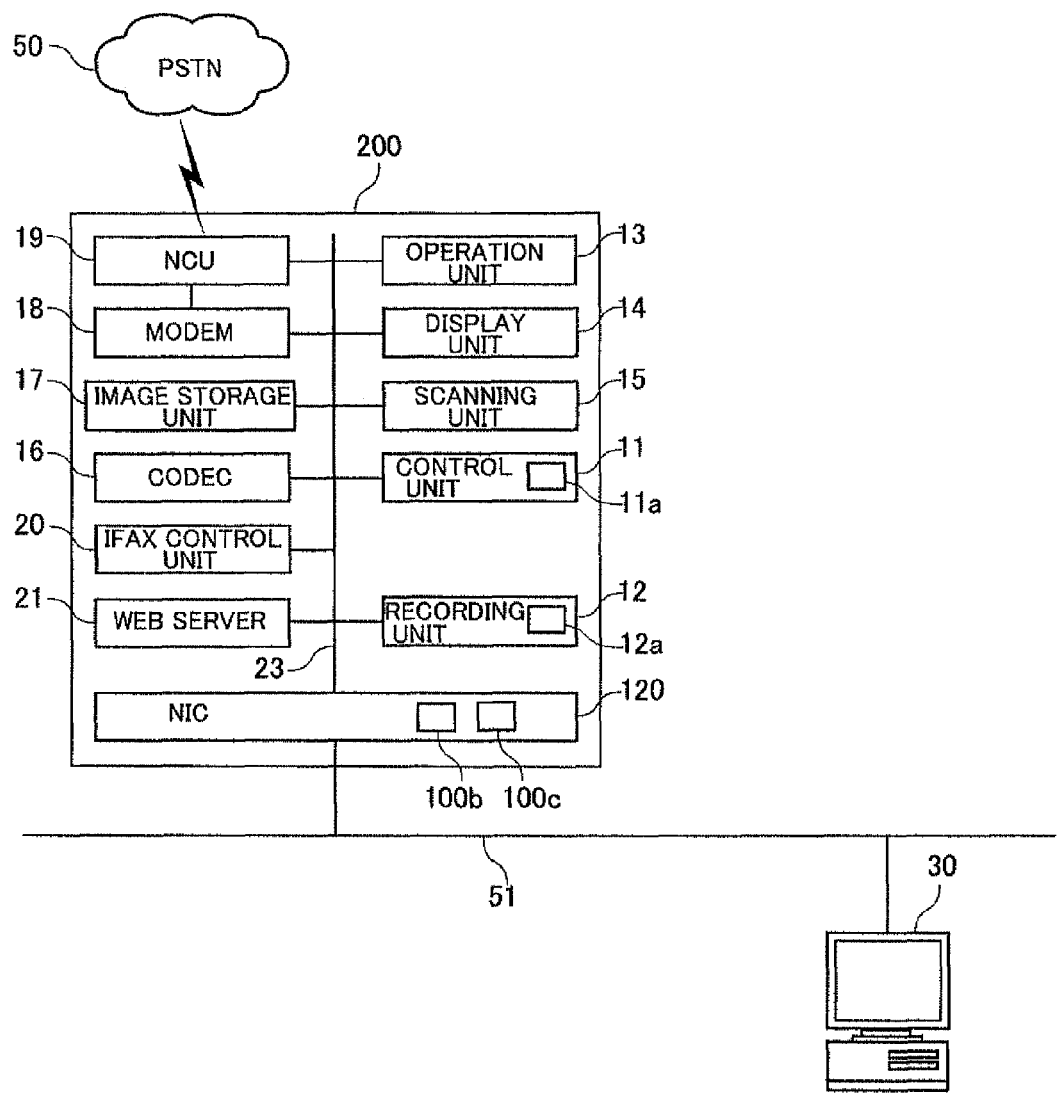
FIG. 15 is a block diagram illustrating an overall configuration of a network multifunctional peripheral according to a fourth embodiment.

A configuration of a network MFP 200 according to a fourth embodiment is now described with reference to FIG. 15. FIG. 15 is a block diagram illustrating an overall configuration of the network MFP 200. In FIG. 15, like reference numerals are used for elements that are the same as or similar to those of the third embodiment.

The network MFP 200 is different from the network MFP 100 in that a NIC 120 having a memory 100c is provided in place of NIC 110. Moreover, the NIC 120 is different from the NIC 110 in that a persistent connection control unit 100b is provided in place of a persistent connection control unit 100a. The other elements are the same, as or similar to those of the network MFP 100; therefore, description thereof is omitted here.

The memory 100c, which includes a DRAM and the like, for example, temporarily stores received PDL data. More specifically, the NIC 120 monitors information indicating a page break (page open information and page close information), and the memory 100c temporarily stores a page open indicator and page data. A page close indicator is not temporarily stored in the memory 100c, but is temporarily stored in a memory that is arranged in the NIC 120 (not the memory 100c).

The persistent connection control unit 100b executes a persistent connection control with respect to a transmission source of the PDL data (e.g., PC 30) when a request of an interrupt copying process is made. At this point of time, the NIC 120 informs control unit 11 (printer controller 11a) of an instruction to discard raster data of a page that is being processed and to stop a currently-running process.

After scanning of an original document is completed by scanning unit 15, the persistent connection control unit 100b permits the transmission source of the PDL data (e.g., PC 30) to transmit the PDL data. When transmission of the PDL data is permitted, the NIC 120 first transfers a portion of the PDL data stored temporarily in the memory 100c to the control unit 11 (the printer controller 11a), and then transfers a newly-received portion of the PDL data. Accordingly, when the transmission of the PDL data is permitted, the printer controller 11a first expands the portion of the PDL data stored in the memory 100c into raster data, and then expands into raster data the portion of the PDL data accepted newly from the transmission source (PC 30) and outputs the raster data to printer engine 12a.

Figure 16:
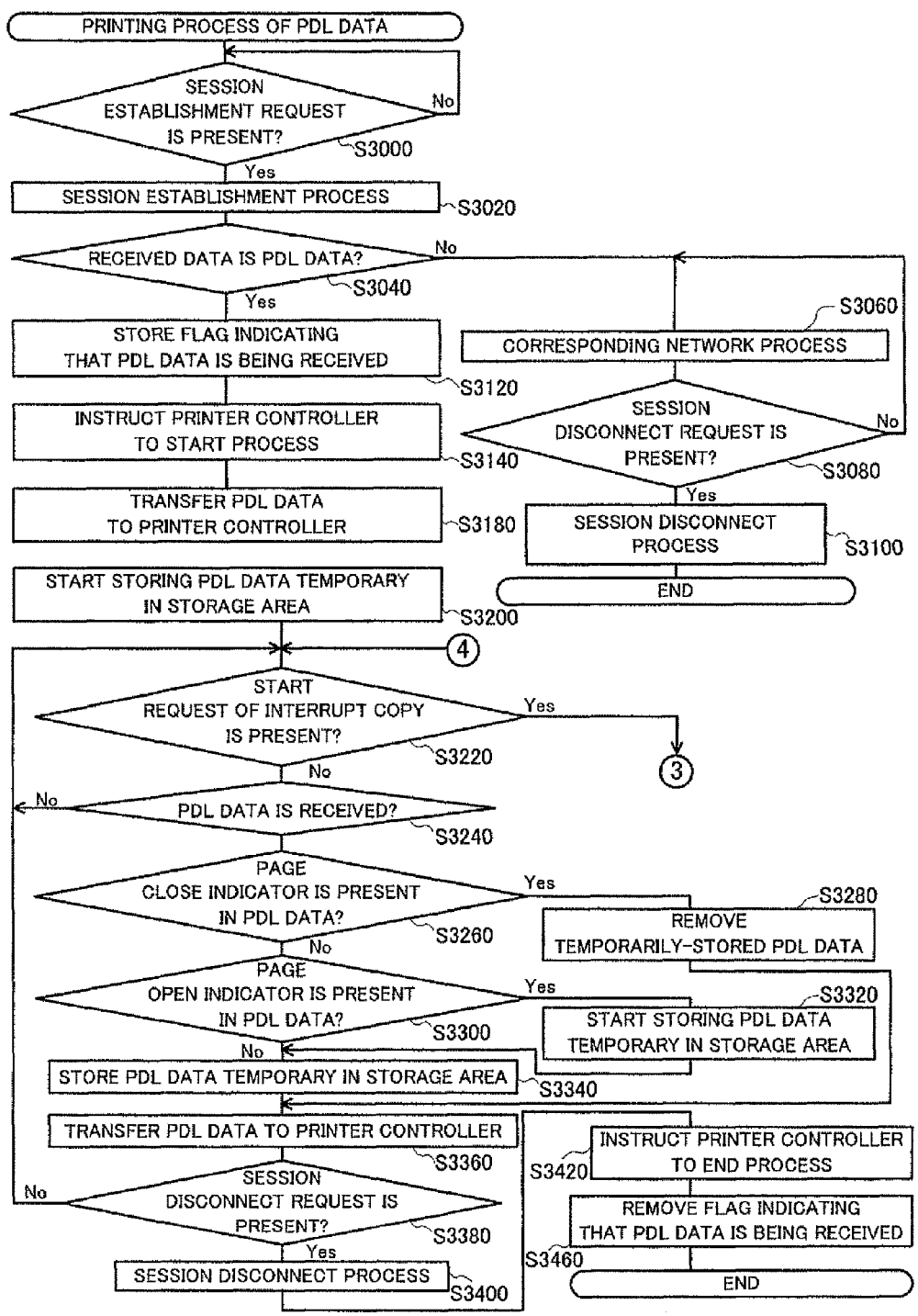
FIG. 16 is the first half of a flowchart illustrating handling procedures of a printing process of PDL data by the network multifunctional peripheral according to the fourth embodiment.
Figure 17:
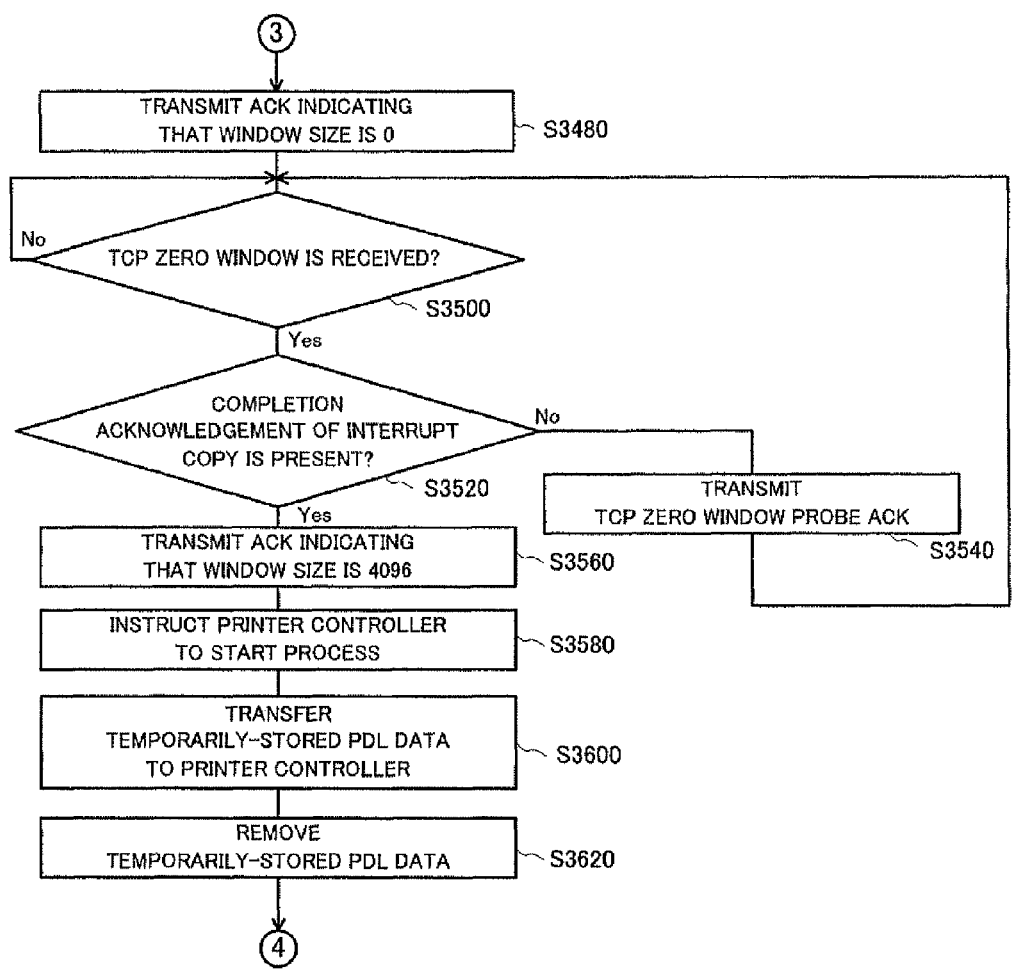
FIG. 17 is the second half of the flowchart illustrating the handling procedures of the printing process of the PDL data by the network multifunctional peripheral according to the fourth embodiment.
Figure 18:
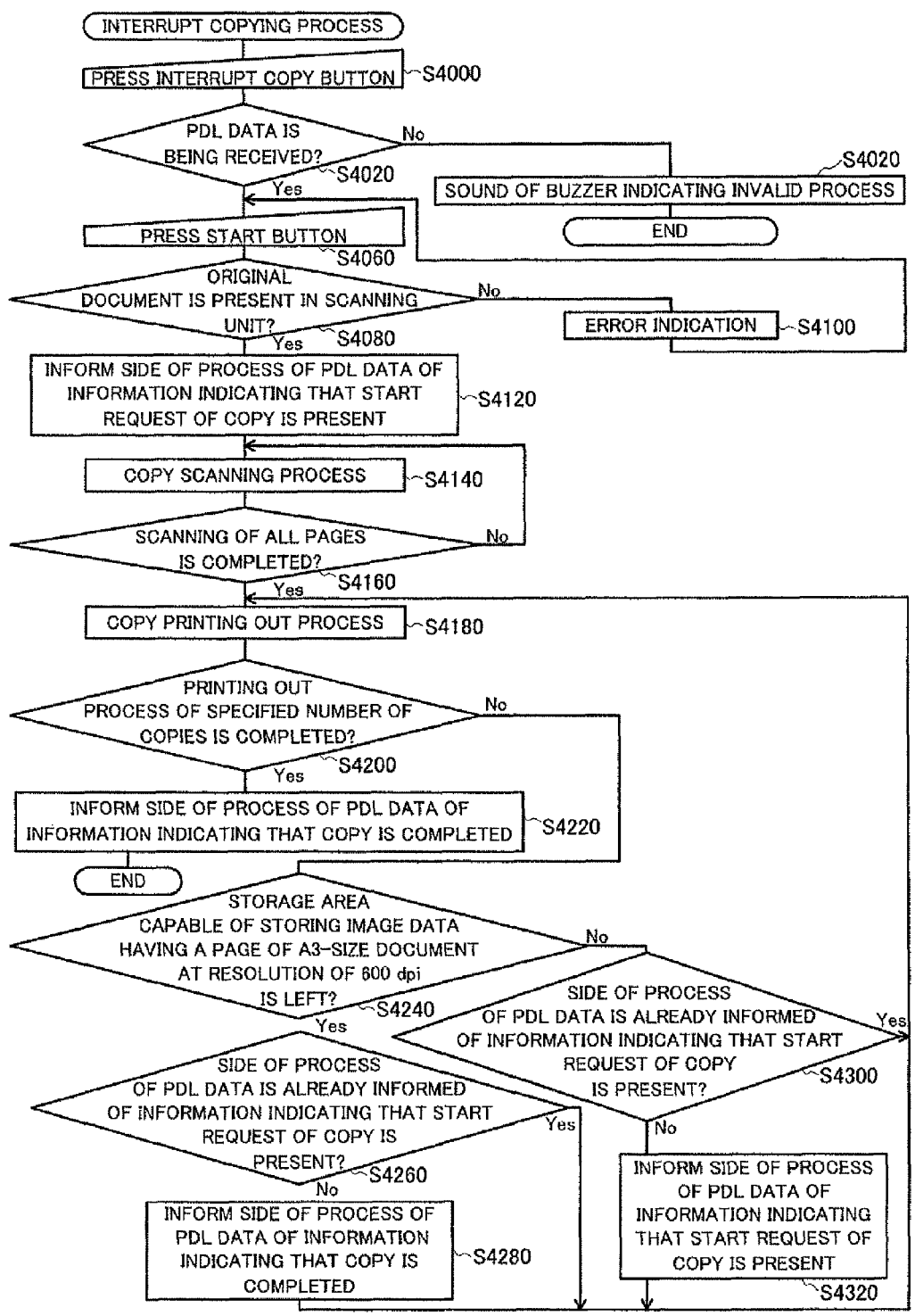
FIG. 18 is a flowchart illustrating handling procedures of an interrupt copying process by the network multifunctional peripheral according to the fourth embodiment.

A printing process and an interrupt copying process of PDL data (PC print data) by the network MFP 200 is now described with reference to FIGS. 16-18. FIGS. 16 and 17 are respectively the first and second halves of a flowchart illustrating handling procedures of the printing process of the PDL data. FIG. 18 is a flowchart illustrating handling procedures of the interrupt copying process.

The printing process of the PDL data is described with reference to FIGS. 16 and 17. Step S3000 determines whether or not a session establishment request is present (i.e., whether or not a SYN signal has been received). If the session establishment request is present, the printing process proceeds to step S3020. If the session establishment request is not present, step S3000 is repeatedly executed until the session establishment request is made.

When the session establishment request is present, a session establishment process is executed in step S3020 such that a session is established with a transmission source of the session establishment request (e.g., the PC 30). More specifically, the session is established by sending an ACK/SYN signal as response to the SYN signal.

Step S3040 then determines whether or not received data is PDL data. If the received data is not PDL data, the process proceeds to step S3060. If the received data is PDL data, the process proceeds to step S3120.

When the received data is not PDL data, a network process corresponding to the received data is executed in step S3060. Step S3080 then determines whether or not a session disconnect request is present (i.e., whether or not a FIN signal for controlling the session to be disconnected has been received). If the session disconnect request is present, the process proceeds to step S3100. If the session disconnect request is not present, the process returns to and repeatedly executes step S3060 until the session disconnect request is made.

When the session disconnect request is present, a session disconnect process is executed in step S3100. More specifically, the session is disconnected by sending an ACK/FIN signal as response. The process is then terminated.

When the received data is PDL data, a flag indicating that the PDL data is being received is stored in step S3120. In step S3140, the printer controller ila is instructed to start a PC printing process. The PDL data is transferred to the printer controller 11a in step S3180, and then temporary storage of the PDL data is started in step S3200.

Step S3220 then determines whether or not a start request of the interrupt copying process is present. If the start request of the interrupt copying process is present, the process proceeds to step S3480 of FIG. 17. If the start request of the interrupt copying process is not present, the process proceeds to step S3240.

Step S3240 determines whether or not the PDL data has been received. If the PDL data has been received, the process proceeds to step S3260. If the PDL data has not been received, the process returns to and repeatedly executes steps S3220 and S3240 until the start request of the interrupt copying process is made or the PDL data is received.

When the PDL data has been received, step S3260 determines whether or not a page close indicator (page close information) indicating a page close is present in the received PDL data. If the page close indicator is present, the temporarily-stored PDL data is removed in step S3280, and then the page close indicator stored in the memory that is arranged in the NIC 120 (not the memory 100c) is transferred to the printer controller 11a in step S3360. If the page close indicator is not present, the process proceeds to step S3300.

Step S3300 determines whether or not a page open indicator (page open information) indicating a page start is present in the received PDL data. If the page open indicator is present, temporary storage of the received PDL data is started in step S3320, and the process then proceeds to step S3340. If the page open indicator is not present, the process directly proceeds to step S3340.

The received PDL data is temporarily stored in step S3340, and then the received PDL data is transferred to the printer controller 11a in step S3360. Step S3380 then determines whether or not a session disconnect request is present. If the session disconnect request is present, the process proceeds to step S3400. If the session disconnect request is not present, the process returns to and repeatedly executes step S3220 and subsequent steps.

When the session disconnect request is present, a session disconnect process is executed in step S3400 such that the session (with PC 30, for example) is disconnected. In step S3420, the printer controller 11a is instructed to end the PC printing process. Then, the flag indicating that the PDL data is being received is removed in step S3460. The process is then terminated.

When step S3220 determines that the start request of the interrupt copying process is present, an ACK indicating that a window size is 0 is transmitted in step S3480 of FIG. 17, and then a persistent connection control, which prohibits the transmission source of the PDL data (e.g., PC 30) from transmitting the PDL data while the session is being connected with the transmission source, is started. Step S3500 then determines whether or not a TCP Zero Window inquiring about whether or not there is any space available in a receive buffer has been received. If the TCP Zero Window has not been received, step S3500 is repeatedly executed until the TCP Zero Window is received. If the TCP Zero Window has been received, the process proceeds to step S3520.

Step S3520 determines whether or not a completion acknowledgement of the interrupt copying process is present. If a reception complete indication of the PDL data is present, the process proceeds to step S3560. If the reception complete indication of the PDL data is not present, the process proceeds to step S3540.

In step S3540, by transmitting a TCP Zero Window Probe ACK indicating that there is no capacity in the receive buffer to the transmission source of the PDL data (e.g., PC 30), the persistent connection control is maintained. The process then returns to and repeatedly executes step S3500 and subsequent steps.

When the reception complete indication of the PDL data is present, by transmitting an ACK indicating that a window size is 4096 in the step S3560, the persistent connection control to the transmission source of the PDL data (e.g., PC 30) is cancelled. In step S3580, the printer controller 11a is instructed to start a PC printing process. Then, in step S3600, the temporarily-stored PDL data is transferred to the printer controller 11a. The temporarily-stored PDL data is then removed in step S3620, and the process then returns to and executes step S3220 and subsequent steps.

The interrupt copying process (steps S4000-S4320) by the network MFP 200 that is illustrated in FIG. 18 is the same as the above-described process of steps S2000-S2320; therefore, description thereof is omitted here.

According to this embodiment, when a request of an interrupt copying process is made, a persistent connection control is executed such that transmission of a PDL data is prohibited. Accordingly, a printing process can be further promptly switched to a copying process; thereby promptly starting and executing the interrupt copying process. Moreover, when transmission of the PDL data is prohibited, a partly-received portion of the PDL data is temporarily stored in the memory 100c. Then, when transmission of the PDL data is permitted after completion of the interrupt copying process, the portion of the PDL data stored in the memory 100c is first expanded into raster data, and then a newly-received portion of the PDL data is expanded into raster data, thereby printing out the PDL data without missing every single portion of the PDL data.

The third and fourth embodiments of the invention have been described; however, the invention is not limited to these embodiments and various changes and modifications can be made. For example, functional arrangements of elements of the networks MFP 100 and MFP 200 are not limited to the arrangements in the above-described embodiments. For example, the memory 100c may be installed in printer controller 11a in place of NIC 120.

In the above-described embodiments, a PC printing process in which a PDL data is used has been described as an example. However, raster data (GDI data) created previously by a driver soft in a PC may be used. When the raster data (GDI data) is divided by an identifier using a TAG, a Boundary, and the like per page, a control similar to the above-described control can be executed. Further, if the raster data is used, the network MFP 1 and network MFP 2 are not required to carry out an expansion process. Further, in the above-described embodiments, as described in FIGS. 7 and 16, after determining that a receiving PDL data includes a page open indicator, the received page open indicator and page data are sequentially temporarily-stored and are sequentially transferred to a printer controller. Then, when a determination is made that a page close indicator is present, the temporarily-stored page open indicator and the page data are removed and the page close indicator is transferred to the printer controller. However, the present invention is not limited to the embodiments. For example, after a portion of PDL data covering a page (a portion including a page open indicator, page data, a page close indicator, and the like) is temporarily stored, the portion of the PDL data covering a page may be transferred to a printer controller and the temporarily-stored portion of the PDL data may be removed after completion of such transfer. Specifically, in FIG. 7, by putting step S336 between steps S326 and S328, the above-described process can be performed. Likewise, in FIG. 16, by putting step S3360 between steps S3260 and S3280, the above-described process can be performed.

Further, in the present invention, the first embodiment may be appropriately combined with the third or fourth embodiment; and the second embodiment may be appropriately combined with the third or fourth embodiment. At this point of time, a persistent connection unit 10b (or a persistent connection control unit 10d) and a persistent connection control unit 100a (or a persistent connection control unit 100b) may be structured to be same, or may be structured to be different.

While the present invention has been described with respect to preferred embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A network printer comprising:
a communication unit for carrying out transmission/reception of data with a communication terminal connected via a network;
an expansion unit for expanding print data received by the communication unit into raster data; and
a recording unit for printing out the raster data expanded by the expansion unit on paper; wherein
the communication unit includes,
a priority level determination unit, when a reception request signal of second print data is newly accepted in the middle of reception of previously-accepted first print data, for determining priority between the first and second print data, and
a first persistent connection control unit
for, when the priority level determination unit determines a priority level of the second print data to be lower than a priority level of the first print data, until reception of the first print data is completed, executing a persistent connection control that prohibits a transmission source of the second print data from transmitting the second print data while a session is being maintained, and
for, when the priority level determination unit determines the priority level of the second print data to be higher than the priority level of the first print data, permitting the transmission source of the second print data to transmit the second print data, and prohibiting a transmission source of the first print data to transmit the first print data in the middle of reception of the second print data while the session is being maintained, and
the first persistent connection control unit executes the persistent connection control by transmitting in accordance with a TCP/IP irrespective of a receivable amount of data in a receive buffer of the network printer, information indicating that there is no space in the receive buffer to a transmission source of print data determined as lower priority data in response to a regular inquiry about whether or not there is any space available in the receive buffer.

2. The network printer according to claim 1, wherein when reception of print data determined as higher priority data between the first and second print data is completed, the first persistent connection control unit permits a transmission source of print data determined as lower priority data to transmit the print data.

3. The network printer according to claim 1, wherein when the priority level of the first print data is determined to be lower than the priority level of the second print data,
the first persistent connection control unit executes the persistent connection control with respect to the transmission source of the first print data at the timing of detection of information indicating a page break included in the first print data, and
the expansion unit expands the first print data into raster data up to a page divided by the information indicating the page break.

4. The network printer according to claim 1 comprising a storage unit for temporarily storing the first print data received by the communication unit, wherein
the first persistent connection control unit executes the persistent connection control with respect to the transmission source of the first print data at the timing that the priority level of the first print data is determined to be lower than the priority level of the second print data, and permits the transmission source of the first print data to transmit the first print data after reception of the second print data is completed, and
when the transmission source of the first print data is permitted to transmit the first print data, the expansion unit expands a portion of the first print data stored in the storage unit into raster data, and then expands a remaining portion of the first print data transmitted from the transmission source of the first print data into raster data.

5. The network printer according to claim 1, wherein the priority level determination unit determines priority between the first and second print data in accordance with priority level information included in each print data.

6. The network printer according to claim 5, wherein the priority level determination unit determines priority between the first and second print data in further consideration of information of a time-specified print and/or security print information in addition to the priority level information included in each print data.

7. The network printer according to claim 5, wherein when the priority level of the first print data is the same as the priority level of the second print data, the priority level determination unit gives priority to the first print data.

8. The network printer according to claim 1 comprising a scanning unit for scanning an original document to create image data, wherein
the recording unit prints out on paper the image data created by the scanning unit, and
the communication unit includes a second persistent connection control unit, when a request of an interrupt copying process using the scanning unit and the recording unit is accepted in the middle of reception of the print data, for executing a persistent connection control that prohibits a transmission source of the print data from transmitting the print data while a session is being connected with the transmission source.

9. The network printer according to claim 8, wherein when scanning of an original document by the scanning unit is completed, the second persistent connection control unit cancels the persistent connection control to permit the transmission source of the print data to transmit the print data.

10. The network printer according to claim 9, wherein
when the request of the interrupt copying process is accepted,
the second persistent connection control unit executes the persistent connection control with respect to the transmission source of the print data at the timing of detection of information indicating a paper break included in the print data, and
the recording unit prints out print data received from the transmission source in which the persistent connection control has been cancelled, after the print data has been printed out on paper up to a page divided by the information indicating the page break and the image data of the original document scanned by the scanning unit has been printed out.

11. The network printer according to claim 10, wherein the second persistent connection control unit does not execute the persistent connection control when the detection of the information indicating the page break is followed by detection of information indicating completion of a print job.

12. The network printer according to claim 9 comprising a storage unit for temporarily storing the print data received by the communication unit, wherein
the second persistent connection control unit executes the persistent connection control with respect to the transmission source of the print data at the timing of the request of the interrupt copying process, and
the recording unit prints out a portion of the print data stored in the storage unit and a remaining portion of the print date received from the transmission source in which the persistent connection control has been cancelled, after the printing out of the image data of the original document scanned by the scanning unit.

13. The network printer according to claim 8, wherein
the print data is PDL data,
when the request of the interrupt copying process is accepted, the second persistent connection control unit executes the persistent connection control with respect to a transmission source of the PDL data at the timing of detection of information indicating a page break included in the PDL data, and
the expansion unit expands the PDL data into raster data up to a page divided by the information indicating the page break, and expands a remaining portion of the PDL data received from the transmission source in which the persistent connection control have been cancelled, after the scanning of the original document by the scanning unit.

14. The network printer according to claim 8, comprising a storage unit for temporarily storing the PDL data received by the communication unit, wherein
the second persistent connection control unit executes the persistent connection control with respect to the transmission source of the PDL data at the timing of the request of the interrupt copying process,
the expansion unit expands into raster data a portion of the PDL data stored in the storage unit and a remaining portion of the PDL data received from the transmission source in which the persistent connection control has been cancelled, after the cancellation of the persistent connection control, and the recording unit prints out the raster data expanded by the expansion unit after the printing out of the image data of the original document scanned by the scanning unit.

15. The network printer according to claim 8, wherein the print data is GDI data.

16. The network printer according to claim 8, wherein the second persistent connection control unit transmits information indicating that the receivable amount of data of the network printer is substantially zero to the transmission source in accordance with the TCP/IP at the time of execution of the persistent connection control.

17. The network printer according to claim 1, wherein the first persistent connection control unit transmits the information indicating that there is no space in the receive buffer in response to the regular inquiry about whether or not there is any space available in the receive buffer until reception of print data determined as higher priority is completed.

* * * * *